(12) United States Patent
Zhang et al.

(10) Patent No.: US 12,177,849 B2
(45) Date of Patent: Dec. 24, 2024

(54) TRANSMISSION OF UPLINK CONTROL INFORMATION WITH COLLIDING PUSCH

(71) Applicant: Telefonaktiebolaget LM Ericsson (publ), Stockholm (SE)

(72) Inventors: Jianwei Zhang, Solna (SE); Bikramjit Singh, Kirkkonummi (FI); Yufei Blankenship, Kildeer, IL (US); Robert Baldemair, Solna (SE); Ali Behravan, Stockholm (SE); Sorour Falahati, Stockholm (SE); Majid Gerami, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 329 days.

(21) Appl. No.: 17/629,631

(22) PCT Filed: Aug. 11, 2020

(86) PCT No.: PCT/SE2020/050774
§ 371 (c)(1),
(2) Date: Jan. 24, 2022

(87) PCT Pub. No.: WO2021/029816
PCT Pub. Date: Feb. 18, 2021

(65) Prior Publication Data
US 2022/0248396 A1 Aug. 4, 2022

Related U.S. Application Data

(60) Provisional application No. 62/885,610, filed on Aug. 12, 2019.

(51) Int. Cl.
*H04W 72/21* (2023.01)
*H04L 5/00* (2006.01)
*H04W 72/0446* (2023.01)

(52) U.S. Cl.
CPC ............ *H04W 72/21* (2023.01); *H04L 5/0053* (2013.01); *H04L 5/0055* (2013.01); *H04L 5/0057* (2013.01); *H04W 72/0446* (2013.01)

(58) Field of Classification Search
CPC .................... H04W 72/21; H04W 72/0446; H04L 1/0072; H04L 1/1893; H04L 5/0064;
(Continued)

(56) References Cited

U.S. PATENT DOCUMENTS

2020/0100239 A1* 3/2020 Jassal ................ H04L 5/0094
2020/0305147 A1* 9/2020 Lee .................... H04L 1/1664
(Continued)

FOREIGN PATENT DOCUMENTS

CN 109906576 A 6/2019
CN 109964434 A 7/2019
(Continued)

OTHER PUBLICATIONS

Qualcomm, "Remaining issues for multiplexing UCI on PUSCH", Qualcomm, 3GPP R1-1804804, Agenda Item 7.1.3.2.3, Apr. 2018 ( Year: 2018).*
(Continued)

*Primary Examiner* — Omer S Mian
(74) *Attorney, Agent, or Firm* — Weisberg I.P. Law, P.A.

(57) ABSTRACT

A method and apparatus are disclosed for transmission of one or more UCIs with colliding PUSCH. In one embodiment, a method implemented in a wireless device (WD) is provided. The method includes determining a first uplink control information (UCI) and a second UCI, the first UCI associated with a first physical uplink control channel (PUCCH) and the second UCI associated with a second PUCCH; and combining the first UCI and the second UCI and/or disregarding at least one of the first UCI and the
(Continued)

second UCI and/or transmitting at least one of the first UCI and the second UCI in a time resource.

20 Claims, 8 Drawing Sheets

(58) Field of Classification Search
CPC ... H04L 5/0055; H04L 5/0057; H04L 5/0094; H04L 5/0053; H04L 5/0048
See application file for complete search history.

(56) References Cited

U.S. PATENT DOCUMENTS

| | | | |
|---|---|---|---|
| 2022/0183025 A1* | 6/2022 | Fröberg Olsson | H04L 1/0042 |
| 2022/0407631 A1* | 12/2022 | El Hamss | H04L 1/1854 |

FOREIGN PATENT DOCUMENTS

| | | |
|---|---|---|
| EP | 3468081 A1 | 4/2019 |
| TW | 201922016 A | 6/2019 |
| WO | 2019098697 A1 | 5/2019 |

OTHER PUBLICATIONS

Panasonic, "Discussion on UCI enhancement for URLLC", R1-1906866, 2019 (Year: 2019).*

Chinese Office Action and English Summary dated Jan. 5, 2024 for Application No. 202080058549, consisting of 10 pages.
European Search Report dated May 22, 2024 for Application No. 24162535.9, consisting of 12 pages.
3GPP TSG RAN WG1 Meeting #95 R1-1814273; Title: Offline summary on UCI enhancements for URLLC; Source: OPPO; Agenda Item: 7.2.6.1.2; Document for: Discussion and Decision; Location and Date: Spokane, USA, Nov. 12-16, 2018, consisting of 8 pages.
International Search Report and Written Opinion dated Oct. 14, 2020 for International Application No. PCT/SE2020/050774 filed Aug. 11, 2020, consisting of 11 pages.
3GPP TSG RAN WG1 Meeting #92bis R1-1804804; Title: Remaining issues for multiplexing UCI on PUSCH; Agenda tem: 7.1.3.2.3; Source: Qualcomm Incorporated; Document for: Discussion/Decision; Date and Location: Apr. 16-20, 2018, Sanya, China; consisting of 8 pages.
3GPP TSG RAN WG1 #97 R1-1906866; Title: Discussion on UCI enhancement for URLLC; Source: Panasonic; Agenda Item: 7.2.6.2; Document for: Discussion; Date and Location: May 13-17, 2019, Reno, USA; consisting of 6 pages.
Chinese Office Action and English Summary translation of the Chinese Office Action dated Jun. 5, 2024 issued in corresponding Chinese Application No. 202080058549.X, consisting of 6 pages.
Chinese Notice of Allowance and English machine translation dated Aug. 21, 2024 Patent Application No. 202080058549.X, consisting of 8 pages.

* cited by examiner

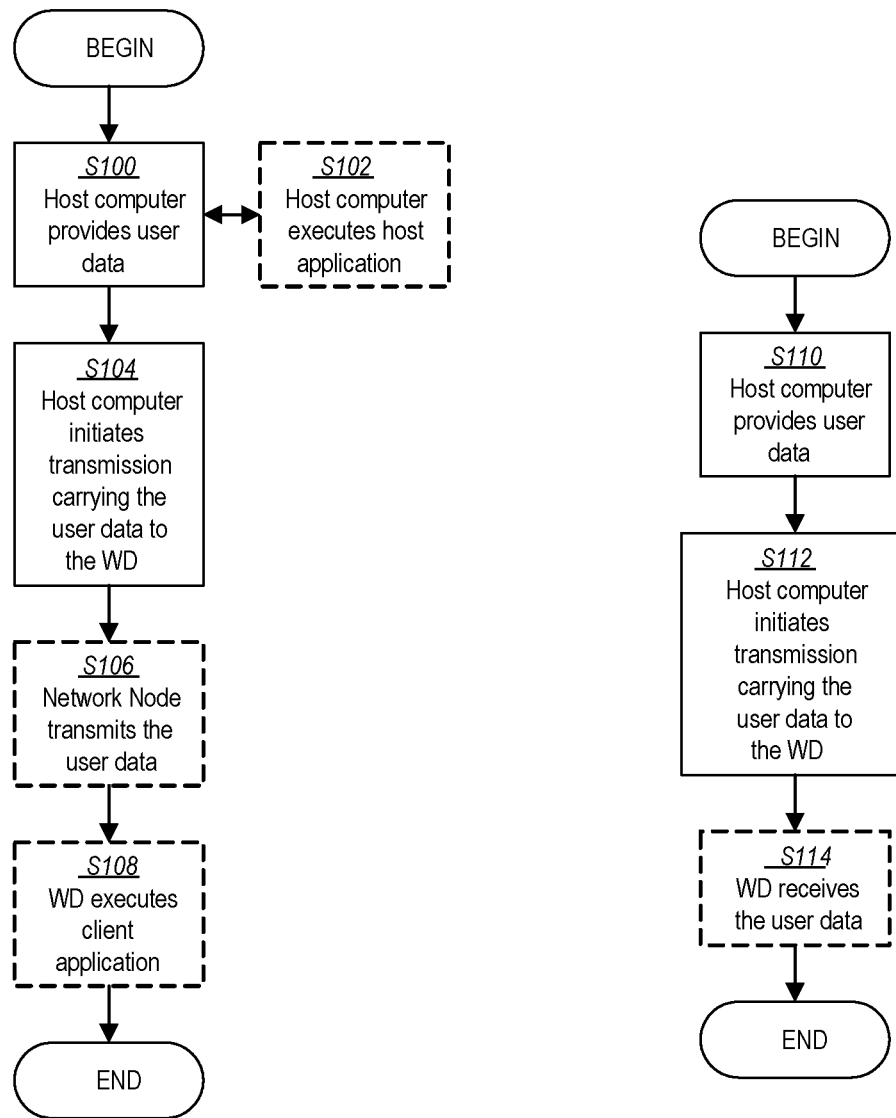

TRANSMISSION OF UPLINK CONTROL INFORMATION WITH COLLIDING PUSCH

CROSS-REFERENCE TO RELATED APPLICATIONS

This application is a Submission Under 35 U.S.C. § 371 for U.S. National Stage Patent Application of International Application No.: PCT/SE2020/050774, filed Aug. 11, 2020 entitled "TRANSMISSION OF UPLINK CONTROL INFORMATION WITH COLLIDING PUSCH," which claims priority to U.S. Provisional Application No. 62/885,610, filed Aug. 12, 2019, entitled "TRANSMISSION OF MULTIPLE HARQ-ACKS WITH COLLIDING PUSCH," the entireties of both of which are incorporated herein by reference.

TECHNICAL FIELD

The present disclosure relates to wireless communications, and in particular, to one or more uplink control information (UCI) transmissions with colliding PUSCH.

BACKGROUND

The New Radio (NR) (also known as "5G") standard of the 3$^{rd}$ Generation Partnership Project (3GPP) is designed to provide services for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

One of the solutions for low latency data transmission is shorter transmission time intervals. In NR in addition to transmission in a slot, a mini-slot transmission is also allowed to reduce latency. A mini-slot is a concept that is used in scheduling and in downlink (DL) a min-slot can include 2, 4 or 7, while in uplink (UL) a mini-slot can be any number of 1 to 14 orthogonal frequency division multiplex (OFDM) symbols. FIG. 1 illustrates an example radio resource in NR with subcarrier spacing of 15 kHz. It should be noted that the concepts of slot and mini-slot are not specific to a specific service meaning that a mini-slot may be used for either eMBB, URLLC, or other services.

Uplink Control Information

Uplink control information (UCI) is carried either by physical uplink control channel (PUCCH) or physical uplink shared channel (PUSCH). It contains one or several uplink control information (UCI), e.g., DL acknowledgement (acknowledgment/non-acknowledgement or ACK/NACK), channel quality indicator (CQI), or scheduling request (SR).

UCI can be transmitted on PUSCH if the WD transmits user data in the UL. In this case PUCCH may not be allowed to be transmitted. When there is no user data to be transmitted, UCI is carried by PUCCH.

Scheduling Request

Scheduling request (SR) can be sent on a physical UL control channel (PUCCH) by a WD to request a grant for an UL transmission, when the WD has data to transmit, but does not have a grant already. The SR can be sent on preconfigured and periodically occurring PUCCH dedicated to the WD device.

The procedure for sending a SR is that, when data is generated on a higher layer by a logical channel, a scheduling request is triggered with an associated SR configuration. Each SR configuration corresponds to one or more logical channels, and each logical channel may be mapped to zero or one SR configuration, which is configured by radio resource control (RRC).

An example RRC configuration for scheduling request resource configuration(s) which maps scheduling request identification (ID) to SR resource configuration is shown below:

```
--ASN1START
--TAG-SCHEDULING-REQUEST-RESOURCE-CONFIG-START
SchedulingRequestResourceConfig ::=    SEQUENCE {
    schedulingRequestResourceId
    SchedulingRequestResourceId,
        schedulingRequestID                 SchedulingRequestId,
        periodicityAndOffset                CHOICE   {
            symb2                           NULL,
            symb6or7                        NULL,
            sl1                             NULL,     --Recurs in
every slot
            sl2                             INTEGER  (0...1),
            sl4                             INTEGER  (0...3),
            sl5                             INTEGER  (0...4),
            sl8                             INTEGER  (0...7),
            sl10                            INTEGER  (0...9),
            sl16                            INTEGER  (0...15),
            sl20                            INTEGER  (0...19),
            sl40                            INTEGER  (0...39),
            sl80                            INTEGER  (0...79),
            sl160                           INTEGER  (0...159),
```

```
    s1320                              INTEGER (0...319),
    s1640                              INTEGER (0...639)
  }                                    OPTIONAL, --
Need M
  resource              PUCCH-ResourceId  OPTIONAL --
Need M
}
--TAG-SCHEDULING-REQUEST-RESOURCE-CONFIG-STOP
--ANISTOP
```

HARQ Feedback

A procedure for receiving a downlink transmission is that the WD first monitors and decodes a PDDCH in slot n which points to a DL data scheduled in slot n+K0 slots (K0 is larger than or equal to 0). The WD then decodes the data in the corresponding PDSCH. Finally, based on the outcome of the decoding the WD sends an acknowledgement of the correct decoding (ACK) or a negative acknowledgement (NACK) to the network node (e.g., gNB) at time slot n+K0+K1. Both of K0 and K1 are indicated in the downlink DCI. The resources for sending the acknowledgement are indicated by a PUCCH resource indicator (PRI) field in PDCCH, which points to one of the PUCCH resources that is configured by higher layers. Depending on DL/UL slot configurations, or whether carrier aggregation, or per code-block group (CBG) transmission used in the DL, the feedback for several PDSCHs may be multiplexed in one feedback. This can be performed by constructing HARQ-ACK codebooks.

Channel State Information

Channel state information (CSI) is used to inform the network node (e.g., gNB) about the channel quality in the DL. CSI can be sent by the WD periodically, semi-persistently, or aperiodically. Periodic and semi-persistent CSI reports are transmitted in PUCCH, while aperiodic CSI reports are only transmitted on PUSCH. The resources for semi-persistent and periodic CSI are configured by RRC, while for aperiodic, CSI is sent on PUSCH, which means that the resources are scheduled dynamically.

Overlapping Between Resources for UCI and PUSCH

There can be a collision between physical resources for transmission of different UL control information (PUCCHs) and/or PUSCH in a slot. In 3GPP Release 15 (Rel-15) there are predefined rules on resolving the collision between such resources. The rules are in general based on multiplexing of UCI in a single PUCCH or a PUSCH resource. Timeline requirements for UCI multiplexing are defined that may be met for multiplexing to be expected by a WD. However, 3GPP Rel-15 does not, in general, support different priorities in the physical (PHY) channel between different UCI types.

SUMMARY

Some embodiments advantageously provide methods and apparatuses for transmission of one or more UCIs (e.g., multiple HARQ-ACKs) with colliding PUSCH.

In one embodiment, a method implemented in a network node is provided. The method includes transmitting signaling to the WD; and receiving at least a first uplink control information (UCI) and a second UCI in a time resource, at least one of the at least the first UCI and the second UCI combined and/or disregarded according to the transmitted signaling.

In one embodiment, a method implemented in a wireless device (WD) is provided. The method includes determining a first uplink control information (UCI) and a second UCI, the first UCI associated with a first physical uplink control channel (PUCCH) and the second UCI associated with a second PUCCH; and combining the first UCI and the second UCI and/or disregarding at least one of the first UCI and the second UCI and/or transmitting at least one of the first UCI and the second UCI in a time resource.

According to an aspect of the present disclosure, a method implemented in a wireless device, WD, is provided. The method includes determining a first uplink control information, UCI, and a second UCI, the first UCI associated with a first sub-slot and a first physical uplink control channel, PUCCH, resource and the second UCI associated with a second sub-slot and a second PUCCH resource, and the first and second sub-slots being comprised within a slot. The method includes determining that there is an overlap in time within the slot between a physical uplink shared channel, PUSCH, and at least one of the first UCI associated with the first sub-slot and the second UCI associated with the second sub-slot. The method includes determining to transmit at least one of the first UCI, the second UCI and the PUSCH within the slot based at least in part on the determined overlap in time.

In some embodiments of this aspect, determining to transmit the at least one of the first UCI, the second UCI and the PUSCH within the slot based at least in part on the determined overlap in time comprises combining the first UCI and the second UCI; and multiplexing the combined first and second UCIs with the PUSCH. In some embodiments of this aspect, how to combine the first UCI and the second UCI is based at least in part on whether the first UCI and the second UCI comprise a same hybrid automatic repeat request, HARQ, codebook type. In some embodiments of this aspect, combining the first UCI and the second UCI comprises: concatenating the first UCI and the second UCI into a composite UCI; using a same beta factor for the concatenated first and second UCIs to generate at least one coded bit of the composite UCI; and multiplexing the combined first and second UCIs with the PUSCH comprises multiplexing the generated at least one coded bit of the composite UCI with at least one coded bit of the PUSCH.

In some embodiments of this aspect, combining the first UCI and the second UCI comprises using a first beta factor for the first UCI to generate at least one coded bit of the first UCI; using a second beta factor for the second UCI to generate at least one coded bit of the second UCI, the second beta factor of the second UCI being independent of the first beta factor of the first UCI; concatenating the at one coded bit of the first UCI and the at one coded bit of the second UCI into a concatenated coded bit sequence; and multiplexing the combined first and second UCIs with the PUSCH comprises multiplexing the concatenated coded bit sequence of the first and second UCIs with at least one coded bit of the PUSCH.

In some embodiments of this aspect, determining to transmit the at least one of the first UCI, the second UCI and the PUSCH within the slot based at least in part on the determined overlap in time further comprises determining a first priority level of the first UCI and a second priority level of the second UCI; when the first priority level is determined to be higher than the second priority level, multiplexing the first UCI with the PUSCH before transmitting the PUSCH within the slot and not transmitting the second UCI within the slot; and when the second priority level is determined to be higher than the first priority level, multiplexing the second UCI with the PUSCH before transmitting the PUSCH and not transmitting the first UCI within the slot.

In some embodiments of this aspect, when the overlap in time within the slot is between the PUSCH and both of the first UCI and the second UCI, determining to transmit the at least one of the first UCI, the second UCI and the PUSCH within the slot comprises determining to transmit the first UCI, the second UCI and only a non-overlapping part of the PUSCH within the slot. In some embodiments of this aspect, when the overlap in time within the slot is between the PUSCH and both of the first UCI and the second UCI, determining to transmit the at least one of the first UCI, the second UCI and the PUSCH within the slot comprises determining to transmit the first UCI and the PUSCH within the slot and to not transmit the second UCI within the slot, the PUSCH comprising both a non-overlapping part and an overlapping part of the PUSCH.

In some embodiments of this aspect, when the overlap in time within the slot is between the PUSCH and both of the first UCI and the second UCI, determining to transmit the at least one of the first UCI, the second UCI and the PUSCH within the slot comprises determining to not transmit at least one of the first UCI and the second UCI within the slot based at least in part on whether the one of the first UCI and the second UCI corresponds to a hybrid automatic repeat request, HARQ, acknowledgement. In some embodiments of this aspect, when the overlap in time within the slot is between the PUSCH and both of the first UCI and the second UCI, determining to transmit the at least one of the first UCI, the second UCI and the PUSCH within the slot comprises combining the first UCI and the second UCI; determining to transmit the combined first and second UCI on the first and second PUCCH resources within the slot; and determining to transmit only a non-overlapping part of the PUSCH within the slot.

In some embodiments of this aspect, when the overlap in time within the slot is between the PUSCH and one of the first UCI and the second UCI, determining to transmit the at least one of the first UCI, the second UCI and the PUSCH within the slot comprises: combining the first UCI and the second UCI; determining to transmit the combined first and second UCI on one of first and second PUCCH resource within the slot and to transmit the PUSCH within the slot, the PUSCH comprising both a non-overlapping part and an overlapping part of the PUSCH. In some embodiments of this aspect, determining to transmit the at least one of the first UCI, the second UCI and the PUSCH within the slot based at least in part on the determined overlap in time further comprises when the PUSCH is a PUSCH repetition associated with an uplink configured grant, determining to not transmit the PUSCH repetition within the slot.

In some embodiments of this aspect, the first UCI includes a first hybrid automatic repeat request, HARQ, codebook and the second UCI includes a second hybrid automatic repeat request, HARQ, codebook. In some embodiments of this aspect, the first UCI includes at least one of a first hybrid automatic repeat request, HARQ, codebook, a first channel state information, CSI, and a first scheduling request, SR, and the second UCI includes at least one of a second HARQ codebook, a second CSI and a second SR.

According to another aspect of the present disclosure, a method implemented in a network node is provided. The method includes receiving at least one of a first uplink control information, UCI, a second UCI and a physical uplink shared channel, PUSCH within a slot based at least in part on an overlap in time, the overlap in time being between the PUSCH and at least one of the first UCI and the second UCI, and the first UCI being associated with a first sub-slot and a first physical uplink control channel, PUCCH, resource, the second UCI being associated with a second sub-slot and a second PUCCH resource, and the first and second sub-slots being comprised within the slot.

In some embodiments of this aspect, receiving the at least one of the first UCI, the second UCI and the PUSCH within the slot based at least in part on the overlap in time comprises receiving the first UCI, the second UCI and the PUSCH, the first UCI and the second UCI being combined and the combined first and second UCIs being multiplexed with the PUSCH. In some embodiments of this aspect, how the first UCI and the second UCI are combined is based at least in part on whether the first UCI and the second UCI comprise a same hybrid automatic repeat request, HARQ, codebook type. In some embodiments of this aspect, the first UCI and the second UCI are combined by: concatenation of the first UCI and the second UCI into a composite UCI; use of a same beta factor for the concatenated first and second UCIs to generate at least one coded bit of the composite UCI; and the combined first and second UCIs being multiplexed with the PUSCH by: multiplexing the generated at least one coded bit of the composite UCI with at least one coded bit of the PUSCH.

In some embodiments of this aspect, the first UCI and the second UCI are combined by using a first beta factor for the first UCI to generate at least one coded bit of the first UCI; using a second beta factor for the second UCI to generate at least one coded bit of the second UCI, the second beta factor of the second UCI being independent of the first beta factor of the first UCI; and concatenation of the at one coded bit of the first UCI and the at one coded bit of the second UCI into a concatenated coded bit sequence; and the combined first and second UCIs being multiplexed with the PUSCH by multiplexing the concatenated coded bit sequence of the first and second UCIs with at least one coded bit of the PUSCH.

In some embodiments of this aspect, the first UCI is associated with a first priority level and the second UCI a second priority level of the second UCI; when the first priority level is higher than the second priority level, receiving the at least one of the first UCI, the second UCI and the PUSCH within the slot comprises receiving the first UCI within the slot as multiplexed with the PUSCH, the second UCI not being transmitted within the slot; and when the second priority level is higher than the first priority level, receiving the at least one of the first UCI, the second UCI and the PUSCH within the slot comprises receiving the second UCI within the slot as multiplexed with the PUSCH, the first UCI not being transmitted within the slot.

In some embodiments of this aspect, when the overlap in time within the slot is between the PUSCH and both of the first UCI and the second UCI, receiving the at least one of the first UCI, the second UCI and the PUSCH within the slot comprises receiving the first UCI, the second UCI and only a non-overlapping part of the PUSCH within the slot. In some embodiments of this aspect, when the overlap in time within the slot is between the PUSCH and both of the first UCI and the second UCI, receiving the at least one of the first UCI, the second UCI and the PUSCH within the slot comprises receiving the first UCI and the PUSCH within the slot, the PUSCH comprising both a non-overlapping part and an overlapping part of the PUSCH and the second UCI not being transmitted within the slot.

In some embodiments of this aspect, when the overlap in time within the slot is between the PUSCH and both of the first UCI and the second UCI, receiving the at least one of the first UCI, the second UCI and the PUSCH within the slot comprises receiving the at least one of the first UCI and the second UCI within the slot based at least in part on whether the one of the first UCI and the second UCI corresponds to a hybrid automatic repeat request, HARQ, acknowledgement. In some embodiments of this aspect, when the overlap in time within the slot is between the PUSCH and both of the first UCI and the second UCI, receiving the at least one of the first UCI, the second UCI and the PUSCH within the slot comprises receiving the first UCI, the second UCI and a non-overlapping part of the PUSCH within the slot, the first and second UCI being combined on the first and second PUCCH resources within the slot.

In some embodiments of this aspect, when the overlap in time within the slot is between the PUSCH and one of the first UCI and the second UCI, receiving the at least one of the first UCI, the second UCI and the PUSCH within the slot comprises: receiving the first UCI, the second UCI and the PUSCH, the PUSCH comprising both a non-overlapping part and an overlapping part of the PUSCH, the first UCI and the second UCI being combined on one of first and second PUCCH resource within the slot. In some embodiments of this aspect, receiving the at least one of the first UCI, the second UCI and the PUSCH within the slot based at least in part on the overlap in time further comprises when the PUSCH is a PUSCH repetition associated with an uplink configured grant, receiving at least one of the first UCI and the second UCI, the PUSCH repetition being not transmitted within the slot.

In some embodiments of this aspect, the first UCI includes a first hybrid automatic repeat request, HARQ, codebook and the second UCI includes a second hybrid automatic repeat request, HARQ, codebook. In some embodiments of this aspect, the first UCI includes at least one of a first hybrid automatic repeat request, HARQ, codebook, a first channel state information, CSI, and a first scheduling request, SR, and the second UCI includes at least one of a second HARQ codebook, a second CSI and a second SR. In some embodiments of this aspect, the method further includes transmitting signalling to a wireless device; and wherein receiving the first UCI, the second UCI and the PUSCH is based at least in part on the signalling.

According to yet another aspect of the present disclosure, a wireless device, WD, configured to communicate with a network node is provided. The wireless device includes processing circuitry. The processing circuitry is configured to cause the wireless device to determine a first uplink control information, UCI, and a second UCI, the first UCI associated with a first sub-slot and a first physical uplink control channel, PUCCH, resource and the second UCI associated with a second sub-slot and a second PUCCH resource, and the first and second sub-slots being comprised within a slot. The processing circuitry is configured to cause the wireless device to determine that there is an overlap in time within the slot between a physical uplink shared channel, PUSCH, and at least one of the first UCI associated with the first sub-slot and the second UCI associated with the second sub-slot. The processing circuitry is configured to cause the wireless device to determine to transmit at least one of the first UCI, the second UCI and the PUSCH within the slot based at least in part on the determined overlap in time.

In some embodiments of this aspect, the processing circuitry is configured to determine to transmit the at least one of the first UCI, the second UCI and the PUSCH within the slot based at least in part on the determined overlap in time by being configured to cause the wireless device to combine the first UCI and the second UCI; and multiplex the combined first and second UCIs with the PUSCH. In some embodiments of this aspect, how to combine the first UCI and the second UCI is based at least in part on whether the first UCI and the second UCI comprise a same hybrid automatic repeat request, HARQ, codebook type. In some embodiments of this aspect, the processing circuitry is configured to combine the first UCI and the second UCI by being configured to cause the wireless device to concatenate the first UCI and the second UCI into a composite UCI; use a same beta factor for the concatenated first and second UCIs to generate at least one coded bit of the composite UCI; and the processing circuitry is configured to multiplex the combined first and second UCIs with the PUSCH by being configured to: multiplex the generated at least one coded bit of the composite UCI with at least one coded bit of the PUSCH.

In some embodiments of this aspect, the processing circuitry is configured to combine the first UCI and the second UCI by being configured to cause the wireless device to: use a first beta factor for the first UCI to generate at least one coded bit of the first UCI; use a second beta factor for the second UCI to generate at least one coded bit of the second UCI, the second beta factor of the second UCI being independent of the first beta factor of the first UCI; concatenate the at one coded bit of the first UCI and the at one coded bit of the second UCI into a concatenated coded bit sequence; and the processing circuitry is configured to multiplex the combined first and second UCIs with the PUSCH by being configured to: multiplex the concatenated coded bit sequence of the first and second UCIs with at least one coded bit of the PUSCH.

In some embodiments of this aspect, the processing circuitry is configured to determine to transmit the at least one of the first UCI, the second UCI and the PUSCH within the slot based at least in part on the determined overlap in time by being configured to cause the wireless device to: determine a first priority level of the first UCI and a second priority level of the second UCI; when the first priority level is determined to be higher than the second priority level, multiplex the first UCI with the PUSCH before transmitting the PUSCH within the slot and not transmitting the second UCI within the slot; and when the second priority level is determined to be higher than the first priority level, multiplex the second UCI with the PUSCH before transmitting the PUSCH and not transmitting the first UCI within the slot.

In some embodiments of this aspect, when the overlap in time within the slot is between the PUSCH and both of the first UCI and the second UCI, the processing circuitry is configured to determine to transmit the at least one of the first UCI, the second UCI and the PUSCH within the slot by being configured to cause the wireless device to determine to transmit the first UCI, the second UCI and only a non-overlapping part of the PUSCH within the slot. In some embodiments of this aspect, when the overlap in time within the slot is between the PUSCH and both of the first UCI and the second UCI, the processing circuitry is configured to determine to transmit the at least one of the first UCI, the second UCI and the PUSCH within the slot by being configured to cause the wireless device to: determine to transmit the first UCI and the PUSCH within the slot and to not transmit the second UCI within the slot, the PUSCH comprising both a non-overlapping part and an overlapping part of the PUSCH.

In some embodiments of this aspect, when the overlap in time within the slot is between the PUSCH and both of the first UCI and the second UCI, the processing circuitry is configured to determine to transmit the at least one of the first UCI, the second UCI and the PUSCH within the slot by being configured to cause the wireless device to: determine to not transmit at least one of the first UCI and the second UCI within the slot based at least in part on whether the one of the first UCI and the second UCI corresponds to a hybrid automatic repeat request, HARQ, acknowledgement. In some embodiments of this aspect, when the overlap in time within the slot is between the PUSCH and both of the first UCI and the second UCI, the processing circuitry is configured to determine to transmit the at least one of the first UCI, the second UCI and the PUSCH within the slot by being configured to cause the wireless device to: combine the first UCI and the second UCI; determine to transmit the combined first and second UCI on the first and second PUCCH resources within the slot; and determine to transmit only a non-overlapping part of the PUSCH within the slot.

In some embodiments of this aspect, when the overlap in time within the slot is between the PUSCH and one of the first UCI and the second UCI, the processing circuitry is configured to determine to transmit the at least one of the first UCI, the second UCI and the PUSCH within the slot by being configured to cause the wireless device to: combine the first UCI and the second UCI; determine to transmit the combined first and second UCI on one of first and second PUCCH resource within the slot and to transmit the PUSCH within the slot, the PUSCH comprising both a non-overlapping part and an overlapping part of the PUSCH. In some embodiments of this aspect, the processing circuitry is configured to determine to transmit the at least one of the first UCI, the second UCI and the PUSCH within the slot based at least in part on the determined overlap in time by being configured to cause the wireless device to: when the PUSCH is a PUSCH repetition associated with an uplink configured grant, determine to not transmit the PUSCH repetition within the slot.

In some embodiments of this aspect, the first UCI includes a first hybrid automatic repeat request, HARQ, codebook and the second UCI includes a second hybrid automatic repeat request, HARQ, codebook. In some embodiments of this aspect, the first UCI includes at least one of a first hybrid automatic repeat request, HARQ, codebook, a first channel state information, CSI, and a first scheduling request, SR, and the second UCI includes at least one of a second HARQ codebook, a second CSI and a second SR.

According to another aspect of the present disclosure, a network node configured to communicate with a wireless device is provided. The network node includes processing circuitry. The processing circuitry is configured to cause the network node to receive at least one of a first uplink control information, UCI, a second UCI and a physical uplink shared channel, PUSCH within a slot based at least in part on an overlap in time. The overlap in time is between the PUSCH and at least one of the first UCI and the second UCI, and the first UCI is associated with a first sub-slot and a first physical uplink control channel, PUCCH, resource, the second UCI is associated with a second sub-slot and a second PUCCH resource, and the first and second sub-slots are comprised within the slot.

In some embodiments of this aspect, the processing circuitry is configured to cause the network node to receive the at least one of the first UCI, the second UCI and the PUSCH within the slot based at least in part on the overlap in time by being configured to cause the network node to receive the first UCI, the second UCI and the PUSCH, the first UCI and the second UCI being combined and the combined first and second UCIs being multiplexed with the PUSCH. In some embodiments of this aspect, how the first UCI and the second UCI are combined is based at least in part on whether the first UCI and the second UCI comprise a same hybrid automatic repeat request, HARQ, codebook type. In some embodiments of this aspect, the first UCI and the second UCI are combined by: concatenation of the first UCI and the second UCI into a composite UCI; use of a same beta factor for the concatenated first and second UCIs to generate at least one coded bit of the composite UCI; and the combined first and second UCIs being multiplexed with the PUSCH by: multiplexing the generated at least one coded bit of the composite UCI with at least one coded bit of the PUSCH.

In some embodiments of this aspect, the first UCI and the second UCI are combined by: using a first beta factor for the first UCI to generate at least one coded bit of the first UCI; using a second beta factor for the second UCI to generate at least one coded bit of the second UCI, the second beta factor of the second UCI being independent of the first beta factor of the first UCI; and concatenation of the at one coded bit of the first UCI and the at one coded bit of the second UCI into a concatenated coded bit sequence; and the combined first and second UCIs being multiplexed with the PUSCH by: multiplexing the concatenated coded bit sequence of the first and second UCIs with at least one coded bit of the PUSCH.

In some embodiments of this aspect, the first UCI is associated with a first priority level and the second UCI a second priority level of the second UCI; when the first priority level is higher than the second priority level, the processing circuitry is configured to cause the network node to receive the at least one of the first UCI, the second UCI and the PUSCH within the slot by being configured to cause the network node to: receive the first UCI within the slot as multiplexed with the PUSCH, the second UCI not being transmitted within the slot; and when the second priority level is higher than the first priority level, the processing circuitry is configured to cause the network node to receive the at least one of the first UCI, the second UCI and the PUSCH within the slot by being configured to cause the network node to: receive the second UCI within the slot as multiplexed with the PUSCH, the first UCI not being transmitted within the slot.

In some embodiments of this aspect, when the overlap in time within the slot is between the PUSCH and both of the first UCI and the second UCI, the processing circuitry is configured to cause the network node to receive the at least one of the first UCI, the second UCI and the PUSCH within the slot by being configured to cause the network node to: receive the first UCI, the second UCI and only a non-overlapping part of the PUSCH within the slot. In some embodiments of this aspect, when the overlap in time within the slot is between the PUSCH and both of the first UCI and the second UCI, the processing circuitry is configured to cause the network node to receive the at least one of the first UCI, the second UCI and the PUSCH within the slot by being configured to cause the network node to: receive the first UCI and the PUSCH within the slot, the PUSCH comprising both a non-overlapping part and an overlapping part of the PUSCH and the second UCI not being transmitted within the slot.

In some embodiments of this aspect, when the overlap in time within the slot is between the PUSCH and both of the first UCI and the second UCI, the processing circuitry is configured to cause the network node to receive the at least one of the first UCI, the second UCI and the PUSCH within the slot by being configured to cause the network node to: receive the at least one of the first UCI and the second UCI within the slot based at least in part on whether the one of the first UCI and the second UCI corresponds to a hybrid automatic repeat request, HARQ, acknowledgement. In some embodiments of this aspect, when the overlap in time within the slot is between the PUSCH and both of the first UCI and the second UCI, the processing circuitry is configured to cause the network node to receive the at least one of the first UCI, the second UCI and the PUSCH within the slot by being configured to cause the network node to: receive the first UCI, the second UCI and a non-overlapping part of the PUSCH within the slot, the first and second UCI being combined on the first and second PUCCH resources within the slot.

In some embodiments of this aspect, when the overlap in time within the slot is between the PUSCH and one of the first UCI and the second UCI, the processing circuitry is configured to cause the network node to receive the at least one of the first UCI, the second UCI and the PUSCH within the slot by being configured to cause the network node to: receive the first UCI, the second UCI and the PUSCH, the PUSCH comprising both a non-overlapping part and an overlapping part of the PUSCH, the first UCI and the second UCI being combined on one of first and second PUCCH resource within the slot. In some embodiments of this aspect, the processing circuitry is configured to cause the network node to receive the at least one of the first UCI, the second UCI and the PUSCH within the slot based at least in part on the overlap in time by being configured to cause the network node to: when the PUSCH is a PUSCH repetition associated with an uplink configured grant, receive at least one of the first UCI and the second UCI, the PUSCH repetition being not transmitted within the slot.

In some embodiments of this aspect, the first UCI includes a first hybrid automatic repeat request, HARQ, codebook and the second UCI includes a second hybrid automatic repeat request, HARQ, codebook. In some embodiments of this aspect, the first UCI includes at least one of a first hybrid automatic repeat request, HARQ, codebook, a first channel state information, CSI, and a first scheduling request, SR, and the second UCI includes at least one of a second HARQ codebook, a second CSI and a second SR. In some embodiments of this aspect, the processing circuitry is further configured to cause the network node to: transmit signalling to a wireless device; and receive the first UCI, the second UCI and the PUSCH based at least in part on the signalling.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 is a flowchart illustrating exemplary methods implemented in a communication system including a host computer, a network node and a wireless device for executing a client application at a wireless device according to some embodiments of the present disclosure;

FIG. 6 is a flowchart illustrating exemplary methods implemented in a communication system including a host computer, a network node and a wireless device for receiving user data at a wireless device according to some embodiments of the present disclosure;

DETAILED DESCRIPTION

When a PUCCH carrying HARQ ACK overlaps with a PUSCH, one solution is to piggyback HARQ ACK on the PUSCH, i.e., multiplex HARQ ACK with a beta factor into PUSCH resources.

Figure 1:
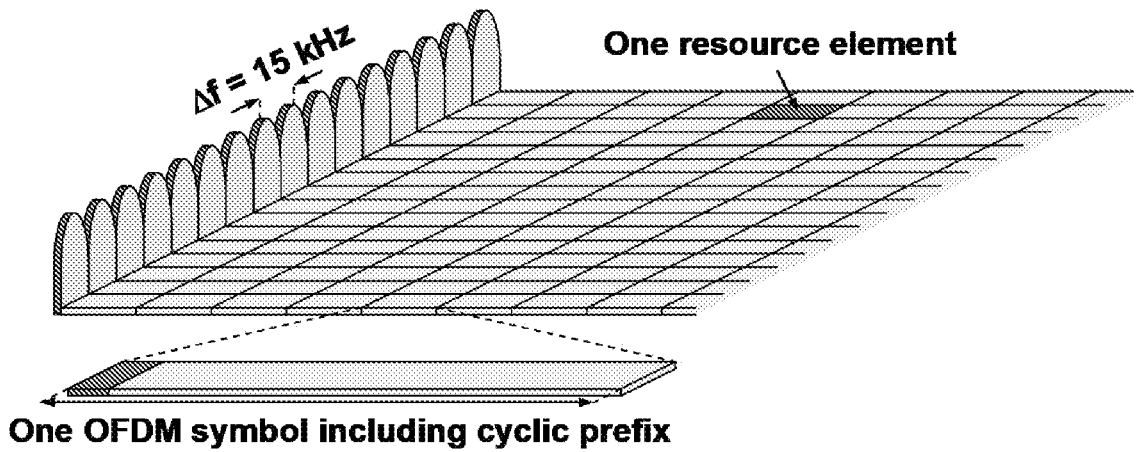
FIG. 1 illustrates an exemplary radio resource in NR with subcarrier spacing of 15 kHz.
Figure 2:
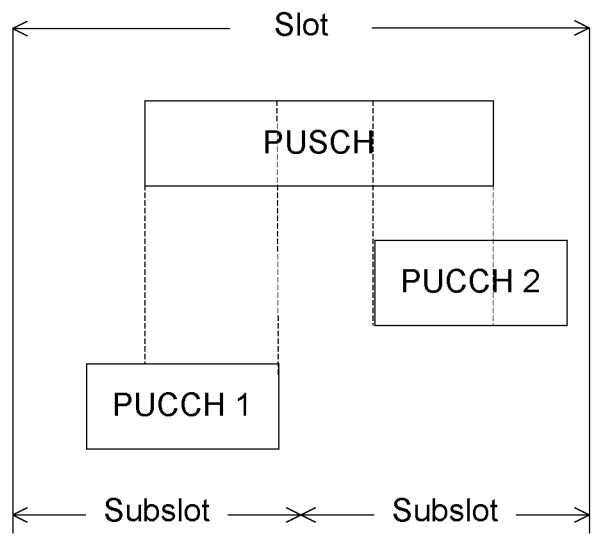
FIG. 2 illustrates an example of 2 PUCCHs colliding with a PUSCH.

In 3GPP Rel-16 (also referred to herein as simply "Rel-16"), there may be two different PUCCHs/UCIs (e.g., carrying HARQ ACKs and/or other UCI, such as, SR, CSI) in the same slot. If the PUCCHs/UCIs collide in time with a PUSCH, it may not be clear how the collision should be resolved. FIG. 2 illustrates an example of 2 PUCCHs (PUCCH1 and PUCCH2) colliding in time with a PUSCH within a slot.

Some embodiments of the present disclosure provide arrangements to resolve overlapping in time between one or more PUCCHs (e.g., 2 PUCCHs) with a PUSCH. Some embodiments of the present disclosure include one or more of (which may be performed by a WD and the resulting transmission received/decoded accordingly by the network node):

Concatenating the two UCIs (e.g., HARQ-ACK codebooks) and then multiplexing the resulting concatenated UCIs (e.g., concatenated HARQ-ACK codebooks) on PUSCH with the same beta factor; and/or Multiplexing one UCI (e.g., HARQ-ACK) on PUSCH with its own beta factor, and then multiplexing the next UCI (e.g., HARQ-ACK) on the resulting PUSCH with a corresponding beta factor.

Another perspective for 'piggybacking' the UCI (e.g., HARQ-ACK) on PUSCH is that the impact on PUSCH data and UCI transmission should be minimized, such as to:

avoid an ambiguity scenario that leads to failed URLLC PUSCH transmission in case of miss detection of PDCCH for eMBB; and/or avoid failed decoding of URLLC HARQ-ACK because of a low reliability requirement on eMBB PUSCH.

Some embodiments of the present disclosure may be applied, such as one or more of (which may be performed by a WD and the resulting transmission received/decoded accordingly by the network node):

i) a fixed number of HARQ-ACK bits for the early PDSCH transmission and such HARQ-ACK bits to be multiplexed on UCI fields with reserved bit field for the HARQ-ACK for a transmission with different reliability requirement or priority;

ii) the HARQ-ACK bits from the different prioritized transmissions can puncture the PUSCH data;
  (1) the PUSCH data can be purely PUSCH or PUSCH data with UCI multiplexed; and/or iii) a configurable field in downlink control information (DCI) to indicate the size of HARQ-ARQ bits. In NR Rel-15 such a bit field already exists to indicate the size of a single HARQ codebook: it is either 1 bit for a semi-static HARQ codebook (include HARQ codebook yes/no), or 2 bits for a dynamic HARQ codebook (size of the codebook mod-4 to reduce the size to two bits). Here, in some embodiments, multiple such DCI fields could be included, one for each multiplexed HARQ codebook (CB). Alternatively, the bit field could be 2 or more bits that expresses the total HARQ codebook size in a mod-X way with X e.g., 4 (DCI field is 2 bit), 8 (DCI field is 3 bit), etc.

Some embodiments of the present disclosure provide arrangements to resolve overlapping between one or more PUCCHs/UCIs with one PUSCH, e.g., in a time resource, such as a slot.

Before describing in detail exemplary embodiments, it is noted that the embodiments reside primarily in combinations of apparatus components and processing steps related to transmission of one or more UCIs (e.g., multiple HARQ-ACKs) with colliding PUSCH. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, the terms "overlap in time" or "collide" or "conflict" are used herein and may be used interchangeably and may be used to indicate a situation in which, for example, at least two different UCIs (e.g., two different HARQ codebooks for two different PDSCHs) are to be transmitted in one uplink time resource (e.g., slot, UL slot scheduled for PUSCH) and/or one or more UCIs overlap in time with at least one PUSCH.

In some embodiments, the term "combine" is used herein and may be used in a broad sense to cover more than one type of combination technique, such as, for example, concatenating, encoding, multiplexing, merging, appending, puncturing, etc.

The term time resource used herein may correspond to any type of physical resource or radio resource expressed in terms of length of time. Examples of time resources are: symbol, slot/mini-slot, subslot, subframe, radio frame, transmission time interval (TTI), interleaving time, etc.

Even though the descriptions herein may be explained in the context of one of a Downlink (DL) and an Uplink (UL) communication, it should be understood that the basic principles disclosed may also be applicable to the other of the one of the DL and the UL communication. In some embodiments in this disclosure, the principles may be considered applicable to a transmitter and a receiver. For DL communication, the network node is the transmitter and the receiver is the WD. For the UL communication, the transmitter is the WD and the receiver is the network node.

Although the description herein may be explained in the context of a physical uplink channel, it should be understood that the principles may also be applicable to other channels.

Any two or more embodiments described in this disclosure may be combined in any way with each other.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

In some embodiments, with puncturing, the information related to a physical channel or signal (e.g., PUSCH data) is mapped to resource elements in the normal way; and in a second step those resource elements that should be empty or carry information related to another physical channel or signal—such as PUCCH—are set to zero and/or replaced by the other channels/signals information. In other words, puncturing, in some embodiments, means that the transmitter deletes the modulation symbols (from a first channel, such as, PUSCH) originally mapped to the punctured resource elements and replaces it with modulation symbols corresponding to the second signal (e.g., PUCCH).

Generally, it may be considered that the network, e.g. a signaling radio node and/or node arrangement (e.g., network node), configures a WD, in particular with the transmission resources. A resource may in general be configured with one or more messages. Different resources may be configured with different messages, and/or with messages on different layers or layer combinations. The size of a resource may be represented in symbols and/or subcarriers and/or resource elements and/or physical resource blocks (depending on domain), and/or in number of bits it may carry, e.g. information or payload bits, or total number of bits. The set of resources, and/or the resources of the sets, may pertain to the same carrier and/or bandwidth part, and/or may be located in the same slot, or in neighboring slots.

In some embodiments, control information on one or more resources may be considered to be transmitted in a message having a specific format. A message may comprise or represent bits representing payload information and coding bits, e.g., for error coding.

Receiving control information may comprise receiving one or more control information messages (e.g., an RRC configuration, DCI, etc.). It may be considered that receiving control signaling comprises demodulating and/or decoding and/or detecting, e.g. blind detection of, one or more messages, in particular a message carried by the control signaling, e.g. based on an assumed set of resources, which may be searched and/or listened for the control information. It may be assumed that both sides of the communication are aware of the configurations, and may determine the set of resources, e.g. based on the reference size.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An indication (e.g., an indication of a HARQ codebook size, prioritization, reliability requirement, an index, a table, etc.) generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have at least two component channels, one for each direction. Examples of channels comprise a channel for low latency and/or high reliability transmission, in particular a channel for Ultra-Reliable Low Latency Communication (URLLC), which may be for control and/or data. In some embodiments, the channel described herein may be an uplink channel and in further embodiments may be a physical uplink shared channel (PUSCH) and in yet further embodiments may be a flexible PUSCH.

Configuring a terminal or wireless device (WD) or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device (e.g., the indication of the resource allocation as discussed above). Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
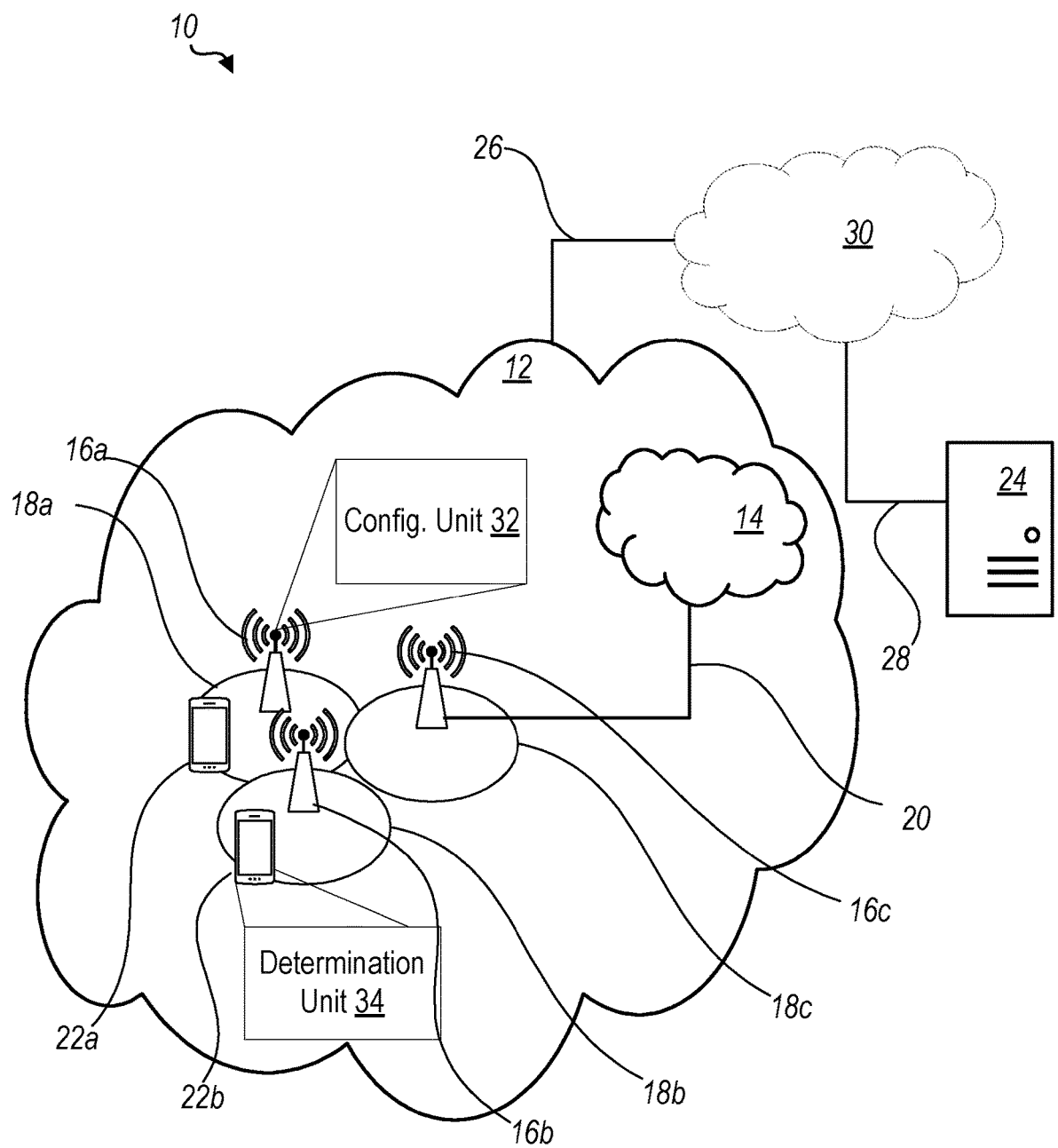
FIG. 3 is a schematic diagram of an exemplary network architecture illustrating a communication system connected via an intermediate network to a host computer according to the principles in the present disclosure.

Some embodiments provide for transmission of one or more UCIs with colliding PUSCH. Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32 which is configured to receive at least one of a first uplink control information, UCI, a second UCI and a physical uplink shared channel, PUSCH within a slot based at least in part on an overlap in time, the overlap in time being between the PUSCH and at least one of the first UCI and the second UCI, and the first UCI being associated with a first sub-slot and a first physical uplink control channel, PUCCH, resource, the second UCI being associated with a second sub-slot and a second PUCCH resource, and the first and second sub-slots being comprised within the slot. In some embodiments, network node 16 is configured to include a configuration unit 32 which is configured to transmit signaling to the WD 22; and receive at least a first uplink control information (UCI) and a second UCI in a time resource, at least one of the at least the first UCI and the second UCI combined and/or disregarded according to the transmitted signaling.

A wireless device 22 is configured to include a determination unit 34 which is configured to determine a first uplink control information, UCI, and a second UCI, the first UCI associated with a first sub-slot and a first physical uplink control channel, PUCCH, resource and the second UCI associated with a second sub-slot and a second PUCCH resource, and the first and second sub-slots being comprised within a slot; determine that there is an overlap in time within the slot between a physical uplink shared channel, PUSCH, and at least one of the first UCI associated with the first sub-slot and the second UCI associated with the second sub-slot; and determine to transmit at least one of the first UCI, the second UCI and the PUSCH within the slot based at least in part on the determined overlap in time. In some embodiments, the wireless device 22 includes determination unit 34 which is configured to determine a first uplink control information (UCI) and a second UCI, the first UCI associated with a first physical uplink control channel (PUCCH) and the second UCI associated with a second PUCCH; and combine the first UCI and the second UCI and/or disregard at least one of the first UCI and the second UCI and/or transmit at least one of the first UCI and the second UCI in a time resource.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to perform the network node methods discussed herein such as those discussed with reference to FIG. 9, for example.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a determination unit 34 configured to perform the WD methods discussed herein such as those discussed with reference to FIG. 10, for example.

Figure 4:
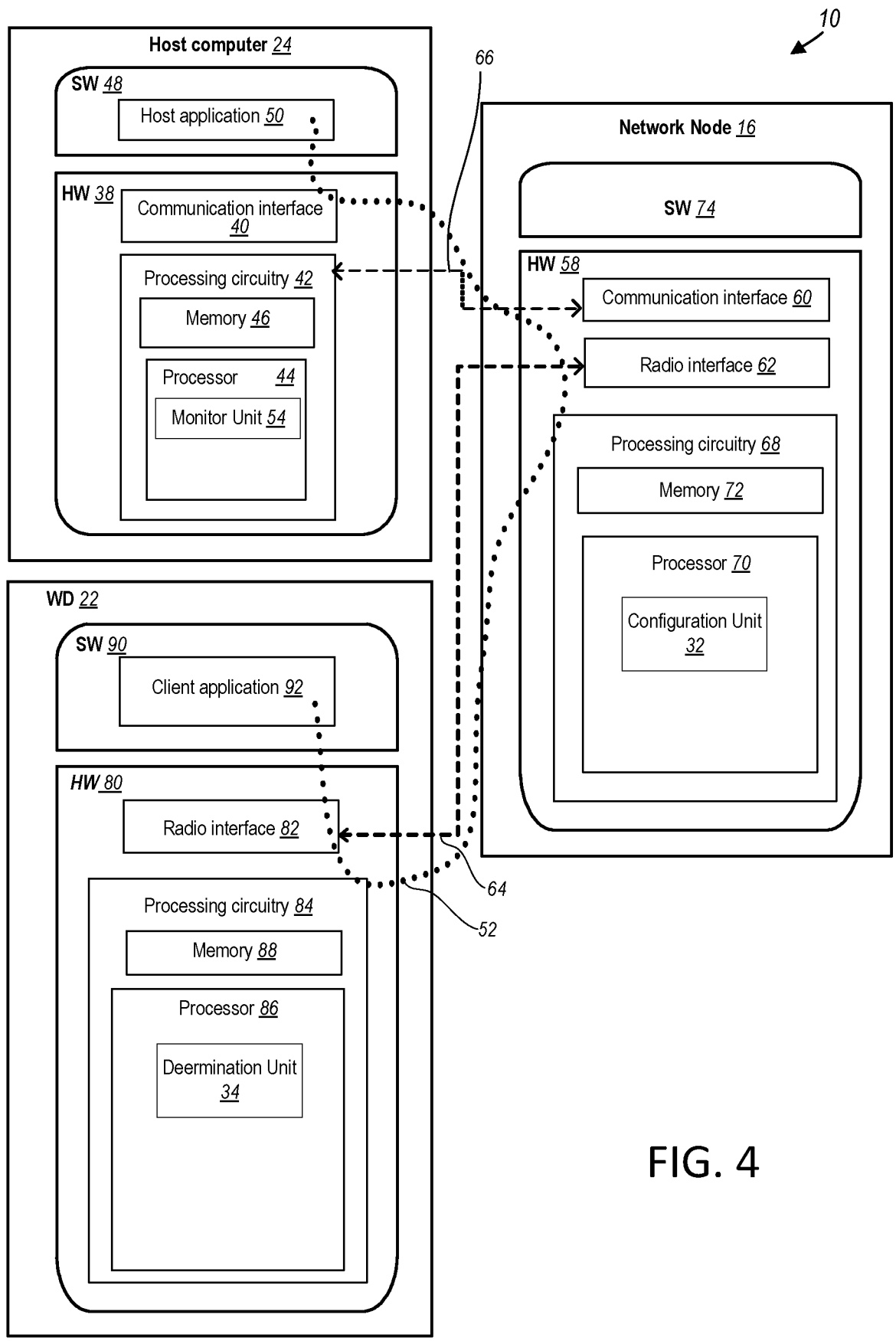
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as configuration unit 32, and determination unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 5 is a flowchart illustrating an exemplary method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 6 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 7:
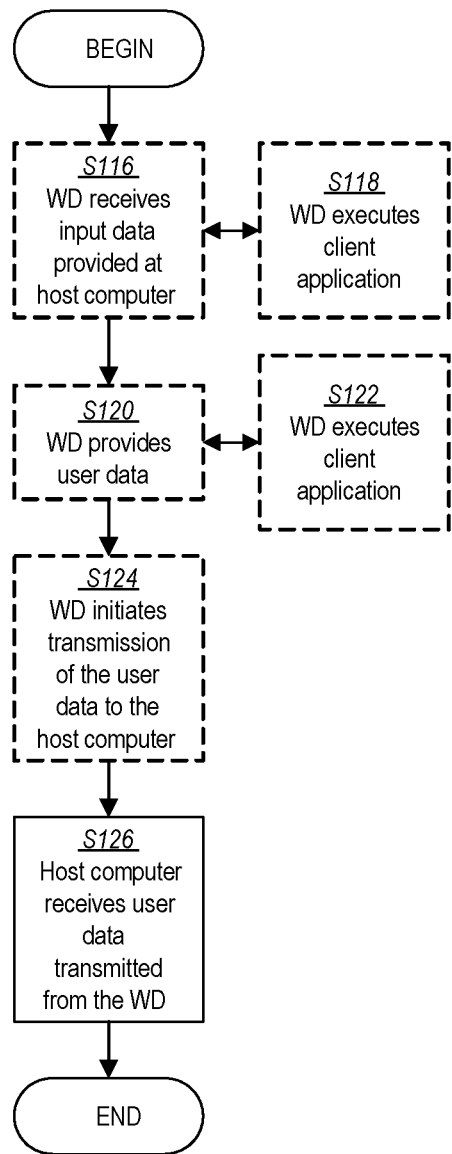
FIG. 7 is a flowchart illustrating exemplary methods implemented in a communication system including a host computer, a network node and a wireless device for receiving user data from the wireless device at a host computer according to some embodiments of the present disclosure.

FIG. 7 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 8:
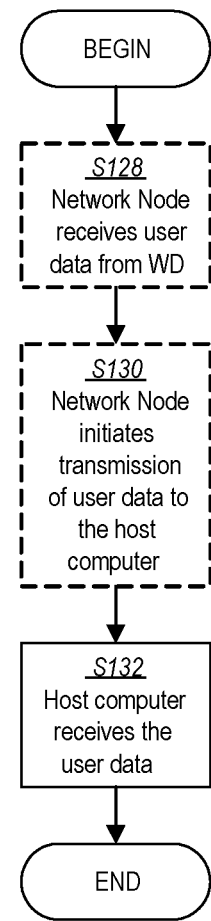
FIG. 8 is a flowchart illustrating exemplary methods implemented in a communication system including a host computer, a network node and a wireless device for receiving user data at a host computer according to some embodiments of the present disclosure.

FIG. 8 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
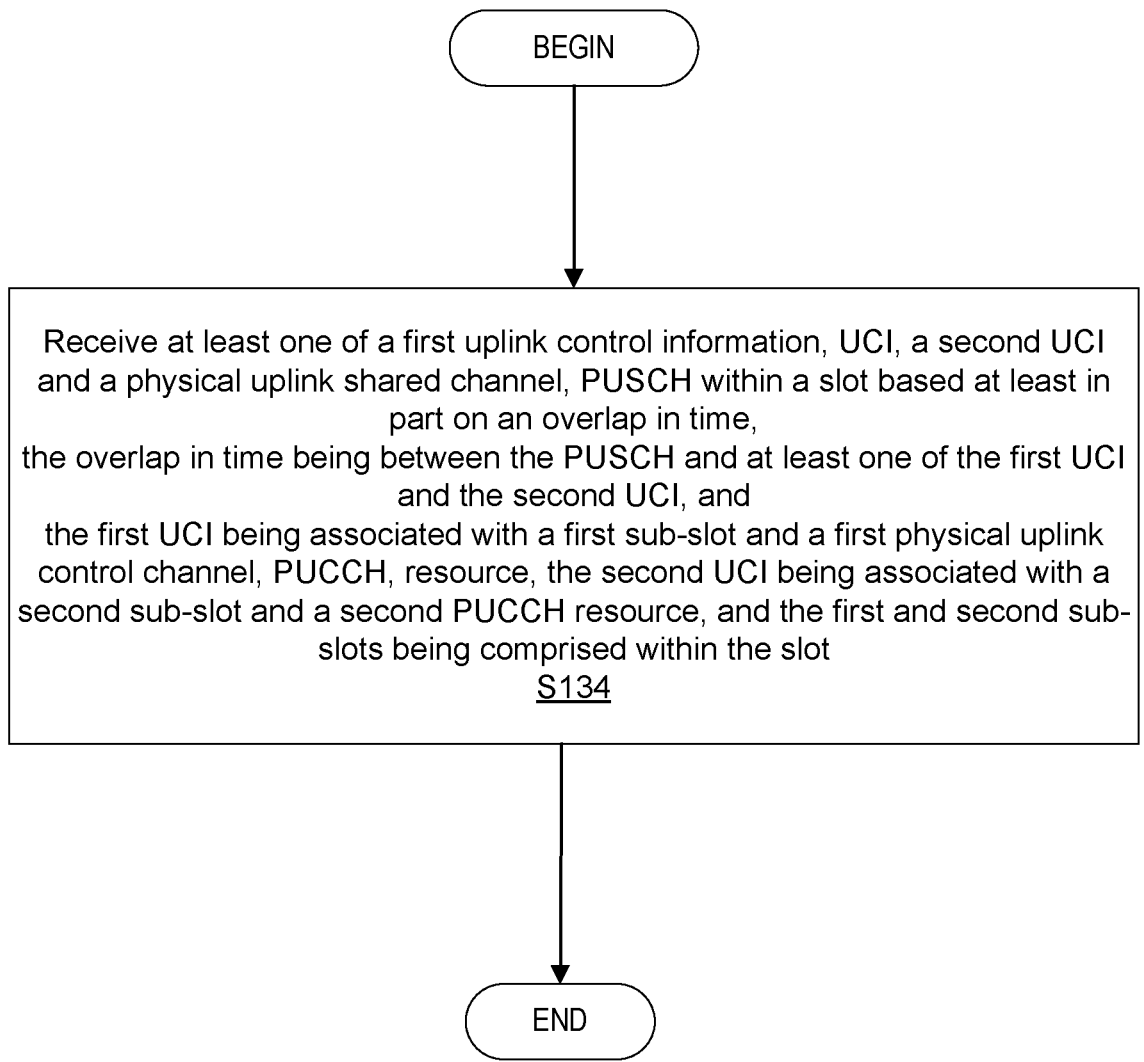
FIG. 9 is a flowchart of an exemplary process in a network node for configuration unit according to some embodiments of the present disclosure.

FIG. 9 is a flowchart of an exemplary process in a network node 16 for configuring of multiple UCIs (e.g., HARQ- ACKs), which may collide with PUSCH according to some embodiments of the present disclosure. One or more Blocks and/or functions and/or methods performed by the network node 16 may be performed by one or more elements of network node 16 such as by configuration unit 32 in processing circuitry 68, processor 70, communication interface 60, radio interface 62, etc. according to the example method. The example method includes receiving (Block S134), such as via configuration unit 32, processing circuitry 68, processor 70, communication interface 60 and/or radio interface 62, at least one of a first uplink control information, UCI, a second UCI and a physical uplink shared channel, PUSCH within a slot based at least in part on an overlap in time. The overlap in time is between the PUSCH and at least one of the first UCI and the second UCI. The first UCI is associated with a first sub-slot and a first physical uplink control channel, PUCCH, resource and the second UCI is associated with a second sub-slot and a second PUCCH resource. The first and second sub-slots are comprised within the slot.

In some embodiments, receiving the at least one of the first UCI, the second UCI and the PUSCH within the slot based at least in part on the overlap in time includes receiving, such as via configuration unit 32, processing circuitry 68, processor 70, communication interface 60 and/or radio interface 62, the first UCI, the second UCI and the PUSCH, the first UCI and the second UCI being combined and the combined first and second UCIs being multiplexed with the PUSCH. In some embodiments, how the first UCI and the second UCI are combined is based at least in part on whether the first UCI and the second UCI comprise a same hybrid automatic repeat request, HARQ, codebook type.

In some embodiments, the first UCI and the second UCI are combined, such as via configuration unit 32, processing circuitry 68, processor 70, communication interface 60 and/or radio interface 62, by concatenation of the first UCI and the second UCI into a composite UCI; use of a same beta factor for the concatenated first and second UCIs to generate at least one coded bit of the composite UCI; and the combined first and second UCIs being multiplexed with the PUSCH by: multiplexing, such as via configuration unit 32, processing circuitry 68, processor 70, communication interface 60 and/or radio interface 62, the generated at least one coded bit of the composite UCI with at least one coded bit of the PUSCH.

In some embodiments, the first UCI and the second UCI are combined by: using a first beta factor for the first UCI to generate at least one coded bit of the first UCI; using a second beta factor for the second UCI to generate at least one coded bit of the second UCI, the second beta factor of the second UCI being independent of the first beta factor of the first UCI; and concatenation of the at one coded bit of the first UCI and the at one coded bit of the second UCI into a concatenated coded bit sequence; and the combined first and second UCIs being multiplexed with the PUSCH by: multiplexing, such as via configuration unit 32, processing circuitry 68, processor 70, communication interface 60 and/or radio interface 62, the concatenated coded bit sequence of the first and second UCIs with at least one coded bit of the PUSCH.

In some embodiments, the first UCI is associated with a first priority level and the second UCI a second priority level of the second UCI; when the first priority level is higher than the second priority level, receiving the at least one of the first UCI, the second UCI and the PUSCH within the slot comprises: receiving, such as via configuration unit 32, processing circuitry 68, processor 70, communication interface 60 and/or radio interface 62, the first UCI within the slot as multiplexed with the PUSCH, the second UCI not being transmitted within the slot; and when the second priority level is higher than the first priority level, receiving the at least one of the first UCI, the second UCI and the PUSCH within the slot comprises: receiving, such as via configuration unit 32, processing circuitry 68, processor 70, communication interface 60 and/or radio interface 62, the second UCI within the slot as multiplexed with the PUSCH, the first UCI not being transmitted within the slot.

In some embodiments, when the overlap in time within the slot is between the PUSCH and both of the first UCI and the second UCI, receiving the at least one of the first UCI, the second UCI and the PUSCH within the slot comprises receiving, such as via configuration unit 32, processing circuitry 68, processor 70, communication interface 60 and/or radio interface 62, the first UCI, the second UCI and only a non-overlapping part of the PUSCH within the slot.

In some embodiments, when the overlap in time within the slot is between the PUSCH and both of the first UCI and the second UCI, receiving the at least one of the first UCI, the second UCI and the PUSCH within the slot comprises: receiving, such as via configuration unit 32, processing circuitry 68, processor 70, communication interface 60 and/or radio interface 62, the first UCI and the PUSCH within the slot, the PUSCH comprising both a non-overlapping part and an overlapping part of the PUSCH and the second UCI not being transmitted within the slot.

In some embodiments, when the overlap in time within the slot is between the PUSCH and both of the first UCI and the second UCI, receiving the at least one of the first UCI, the second UCI and the PUSCH within the slot comprises: receiving, such as via configuration unit 32, processing circuitry 68, processor 70, communication interface 60 and/or radio interface 62, the at least one of the first UCI and the second UCI within the slot based at least in part on whether the one of the first UCI and the second UCI corresponds to a hybrid automatic repeat request, HARQ, acknowledgement. In some embodiments, when the overlap in time within the slot is between the PUSCH and both of the first UCI and the second UCI, receiving the at least one of the first UCI, the second UCI and the PUSCH within the slot comprises: receiving, such as via configuration unit 32, processing circuitry 68, processor 70, communication interface 60 and/or radio interface 62, the first UCI, the second UCI and a non-overlapping part of the PUSCH within the slot, the first and second UCI being combined on the first and second PUCCH resources within the slot.

In some embodiments, when the overlap in time within the slot is between the PUSCH and one of the first UCI and the second UCI, receiving the at least one of the first UCI, the second UCI and the PUSCH within the slot comprises: receiving, such as via configuration unit 32, processing circuitry 68, processor 70, communication interface 60 and/or radio interface 62, the first UCI, the second UCI and the PUSCH, the PUSCH comprising both a non-overlapping part and an overlapping part of the PUSCH, the first UCI and the second UCI being combined on one of first and second PUCCH resource within the slot. In some embodiments, receiving the at least one of the first UCI, the second UCI and the PUSCH within the slot based at least in part on the overlap in time further comprises: when the PUSCH is a PUSCH repetition associated with an uplink configured grant, receiving at least one of the first UCI and the second UCI, the PUSCH repetition being not transmitted within the slot.

In some embodiments, the first UCI includes a first hybrid automatic repeat request, HARQ, codebook and the second UCI includes a second hybrid automatic repeat request, HARQ, codebook. In some embodiments, the first UCI includes at least one of a first hybrid automatic repeat request, HARQ, codebook, a first channel state information, CSI, and a first scheduling request, SR, and the second UCI includes at least one of a second HARQ codebook, a second CSI and a second SR. In some embodiments, the method further includes transmitting, such as via configuration unit 32, processing circuitry 68, processor 70, communication interface 60 and/or radio interface 62, signalling to a wireless device; and wherein receiving the first UCI, the second UCI and the PUSCH is based at least in part on the signalling.

In some embodiments, the method includes transmitting, such as via configuration unit 32, processing circuitry 68, processor 70 and/or radio interface 62, signaling to the WD 22. The method includes receiving, such as via configuration unit 32, processing circuitry 68, processor 70 and/or radio interface 62, at least a first uplink control information (UCI) and a second UCI in a time resource, at least one of the at least the first UCI and the second UCI combined and/or disregarded according to the transmitted signaling.

In some embodiments, the first and second UCIs include first and second HARQ codebooks, respectively. In some embodiments, the time resource is a slot including uplink resources. In some embodiments, the signaling is radio resource control (RRC) signaling and/or downlink control information (DCI) signaling. In some embodiments, the signaling includes a downlink control information (DCI) field indicating a HARQ codebook size. In some embodiments, the signaling includes at least one of an uplink grant and a downlink assignment. In some embodiments, the signaling indicates a prioritization and/or reliability associated with the at least one of the first UCI and the second UCI, the combination and/or the disregarding based at least in part on the indicated prioritization and/or the indicated reliability. In some embodiments, the signaling indicates a number of HARQ bits for the at least one of the first UCI and the second UCI. In some embodiments, the signaling indicates one or more rules for resolving a conflict or a resolution associated with at least one of the first UCI, the second UCI and a physical uplink shared channel (PUSCH). In some embodiments, the signaling includes determining, such as via configuration unit 32, processing circuitry 68, processor 70 and/or radio interface 62, information to be included in the signaling according to one or more of the arrangements discussed herein, before transmitting the signal.

Figure 10:
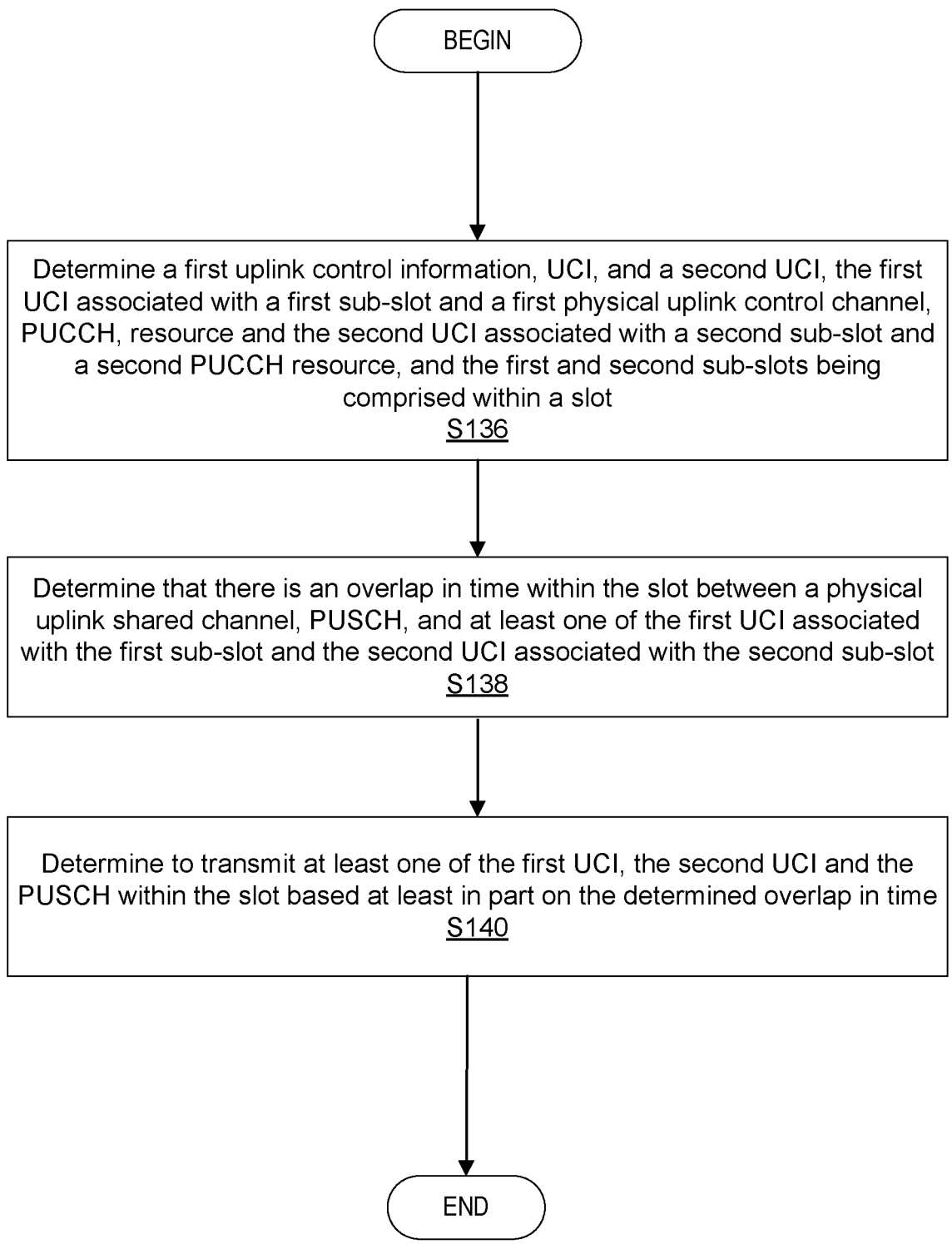
FIG. 10 is a flowchart of an exemplary process in a wireless device for determination according to some embodiments of the present disclosure.

FIG. 10 is a flowchart of an exemplary process in a wireless device 22 for transmission of multiple UCIs (e.g., HARQ-ACKs), which may collide with PUSCH according to some embodiments of the present disclosure. One or more Blocks and/or functions and/or methods performed by WD 22 may be performed by one or more elements of WD 22 such as by determination unit 34 in processing circuitry 84, processor 86, radio interface 82, etc. The example method includes determining (Block S136), such as via determination unit 34, processing circuitry 84, processor 86 and/or radio interface 82, a first uplink control information, UCI, and a second UCI, the first UCI associated with a first sub-slot and a first physical uplink control channel, PUCCH, resource and the second UCI associated with a second sub-slot and a second PUCCH resource, and the first and second sub-slots being comprised within a slot. The method includes determining (Block S138), such as via determination unit 34, processing circuitry 84, processor 86 and/or radio interface 82, that there is an overlap in time within the slot between a physical uplink shared channel, PUSCH, and at least one of the first UCI associated with the first sub-slot and the second UCI associated with the second sub-slot. The method includes determining (Block S140), such as via determination unit 34, processing circuitry 84, processor 86 and/or radio interface 82, to transmit at least one of the first UCI, the second UCI and the PUSCH within the slot based at least in part on the determined overlap in time.

In some embodiments, determining to transmit the at least one of the first UCI, the second UCI and the PUSCH within the slot based at least in part on the determined overlap in time includes combining, such as via determination unit 34, processing circuitry 84, processor 86 and/or radio interface 82, the first UCI and the second UCI; and multiplexing, such as via determination unit 34, processing circuitry 84, processor 86 and/or radio interface 82, the combined first and second UCIs with the PUSCH. In some embodiments, how to combine the first UCI and the second UCI is based at least in part on whether the first UCI and the second UCI comprise a same hybrid automatic repeat request, HARQ, codebook type.

In some embodiments, combining the first UCI and the second UCI comprises: concatenating, such as via determination unit 34, processing circuitry 84, processor 86 and/or radio interface 82, the first UCI and the second UCI into a composite UCI; using a same beta factor for the concatenated first and second UCIs to generate, such as via determination unit 34, processing circuitry 84, processor 86 and/or radio interface 82, at least one coded bit of the composite UCI; and multiplexing the combined first and second UCIs with the PUSCH comprises: multiplexing, such as via determination unit 34, processing circuitry 84, processor 86 and/or radio interface 82, the generated at least one coded bit of the composite UCI with at least one coded bit of the PUSCH.

In some embodiments, combining the first UCI and the second UCI comprises: using a first beta factor for the first UCI to generate, such as via determination unit 34, processing circuitry 84, processor 86 and/or radio interface 82, at least one coded bit of the first UCI; using a second beta factor for the second UCI to generate at least one coded bit of the second UCI, the second beta factor of the second UCI being independent of the first beta factor of the first UCI; concatenating, such as via determination unit 34, processing circuitry 84, processor 86 and/or radio interface 82, the at one coded bit of the first UCI and the at one coded bit of the second UCI into a concatenated coded bit sequence; and multiplexing the combined first and second UCIs with the PUSCH comprises multiplexing, such as via determination unit 34, processing circuitry 84, processor 86 and/or radio interface 82, the concatenated coded bit sequence of the first and second UCIs with at least one coded bit of the PUSCH.

In some embodiments, determining to transmit the at least one of the first UCI, the second UCI and the PUSCH within the slot based at least in part on the determined overlap in time comprises: determining, such as via determination unit 34, processing circuitry 84, processor 86 and/or radio interface 82, a first priority level of the first UCI and a second priority level of the second UCI; when the first priority level is determined to be higher than the second priority level, multiplexing, such as via determination unit 34, processing circuitry 84, processor 86 and/or radio interface 82, the first UCI with the PUSCH before transmitting the PUSCH within the slot and not transmitting the second UCI within the slot; and when the second priority level is determined to be higher than the first priority level, multiplexing, such as via determination unit 34, processing circuitry 84, processor 86 and/or radio interface 82, the second UCI with the PUSCH before transmitting the PUSCH and not transmitting the first UCI within the slot.

In some embodiments, when the overlap in time within the slot is between the PUSCH and both of the first UCI and the second UCI, determining to transmit the at least one of the first UCI, the second UCI and the PUSCH within the slot comprises: determining to transmit the first UCI, the second UCI and only a non-overlapping part of the PUSCH within the slot. In some embodiments, when the overlap in time within the slot is between the PUSCH and both of the first UCI and the second UCI, determining to transmit the at least one of the first UCI, the second UCI and the PUSCH within the slot comprises: determining, such as via determination unit 34, processing circuitry 84, processor 86 and/or radio interface 82, to transmit the first UCI and the PUSCH within the slot and to not transmit the second UCI within the slot, the PUSCH comprising both a non-overlapping part and an overlapping part of the PUSCH.

In some embodiments, when the overlap in time within the slot is between the PUSCH and both of the first UCI and the second UCI, determining to transmit the at least one of the first UCI, the second UCI and the PUSCH within the slot comprises determining, such as via determination unit 34, processing circuitry 84, processor 86 and/or radio interface 82, to not transmit at least one of the first UCI and the second UCI within the slot based at least in part on whether the one of the first UCI and the second UCI corresponds to a hybrid automatic repeat request, HARQ, acknowledgement. In some embodiments, when the overlap in time within the slot is between the PUSCH and both of the first UCI and the second UCI, determining to transmit the at least one of the first UCI, the second UCI and the PUSCH within the slot comprises: combining, such as via determination unit 34, processing circuitry 84, processor 86 and/or radio interface 82, the first UCI and the second UCI; determining to transmit the combined first and second UCI on the first and second PUCCH resources within the slot; and determining, such as via determination unit 34, processing circuitry 84, processor 86 and/or radio interface 82, to transmit only a non-overlapping part of the PUSCH within the slot.

In some embodiments, when the overlap in time within the slot is between the PUSCH and one of the first UCI and the second UCI, determining to transmit the at least one of the first UCI, the second UCI and the PUSCH within the slot comprises combining, such as via determination unit 34, processing circuitry 84, processor 86 and/or radio interface 82, the first UCI and the second UCI; determining, such as via determination unit 34, processing circuitry 84, processor 86 and/or radio interface 82, to transmit the combined first and second UCI on one of first and second PUCCH resource within the slot and to transmit the PUSCH within the slot, the PUSCH comprising both a non-overlapping part and an overlapping part of the PUSCH.

In some embodiments, determining to transmit the at least one of the first UCI, the second UCI and the PUSCH within the slot based at least in part on the determined overlap in time further comprises: when the PUSCH is a PUSCH repetition associated with an uplink configured grant, determining, such as via determination unit 34, processing circuitry 84, processor 86 and/or radio interface 82, to not transmit the PUSCH repetition within the slot. In some embodiments, the first UCI includes a first hybrid automatic repeat request, HARQ, codebook and the second UCI includes a second hybrid automatic repeat request, HARQ, codebook. In some embodiments, the first UCI includes at least one of a first hybrid automatic repeat request, HARQ, codebook, a first channel state information, CSI, and a first scheduling request, SR, and the second UCI includes at least one of a second HARQ codebook, a second CSI and a second SR.

In some embodiments, the method includes determining, such as via determination unit 34, processing circuitry 84, processor 86 and/or radio interface 82, a first uplink control information (UCI) and a second UCI, the first UCI associated with a first physical uplink control channel (PUCCH) and the second UCI associated with a second PUCCH. The method includes combining, such as via determination unit 34, processing circuitry 84, processor 86 and/or radio interface 82, the first UCI and the second UCI and/or disregarding at least one of the first UCI and the second UCI and/or transmitting at least one of the first UCI and the second UCI in a time resource.

In some embodiments, the method further includes receiving, such as via determination unit 34, processing circuitry 84, processor 86 and/or radio interface 82, a signaling from the network node 16, the combining and/or the disregarding and/or the transmitting is based at least in part on the received signalling. In some embodiments, the first and second UCIs include first and second HARQ codebooks, respectively. In some embodiments, the time resource is a slot including uplink resources. In some embodiments, the signaling is radio resource control (RRC) signaling and/or downlink control information (DCI) signaling.

In some embodiments, the method further includes determining, such as via determination unit 34, processing circuitry 84, processor 86 and/or radio interface 82, whether or not there is an overlap or a conflict between the first UCI and the second UCI, the combination and/or the disregarding and/or the transmission is based at least in part on a resolution of the overlap or the conflict. In some embodiments, the method further includes multiplexing, such as via determination unit 34, processing circuitry 84, processor 86 and/or radio interface 82, the combined UCI with physical uplink shared channel (PUSCH) information and transmit the multiplexed UCI on PUSCH. In some embodiments, combining the first UCI and the second UCI further comprises concatenating the first UCI and the second UCI. In some embodiments, combining the first UCI and the second UCI further comprises encoding a first and a second HARQ codebook into a third HARQ codebook that is a function of the first and the second HARQ codebooks. In some embodiments, the method further includes prioritizing, such as via determination unit 34, processing circuitry 84, processor 86 and/or radio interface 82, one of the first UCI and second UCI over another one of the first UCI and second UCI. In some embodiments, the method further includes combining and/or disregarding, such as via determination unit 34, processing circuitry 84, processor 86 and/or radio interface 82, at least one of the first UCI and second UCI based at least in part on the prioritization. In some embodiments, transmitting further includes transmitting, such as via determination unit 34, processing circuitry 84, processor 86 and/or radio interface 82, the prioritized one of the first UCI and second UCI and/or disregarding the other one of the first UCI and second UCI. In some embodiments, how to combine the first UCI and the second UCI is based at least in part on a HARQ codebook type. In some embodiments, the method further includes generating, such as via determination unit 34, processing circuitry 84, processor 86 and/or radio interface 82, a coded bit sequence from at least one of the first UCI and the second UCI using a beta factor selected based at least in part on a reliability requirement.

Having generally described arrangements for transmission of one or more UCIs with colliding PUSCH, functions and processes are provided as follows, and which may be implemented by the network node 16, wireless device 22 and/or host computer 24.

Some embodiments provide arrangements to resolve overlapping/collision in time between 2 or more PUCCHs with a PUSCH, where each PUCCH carries e.g., a HARQ-ACK codebook, SR and/or CSI. While some of the arrangements discussed herein assume two HARQ-ACK codebooks for simplicity, the same principle applies when there are more than two HARQ-ACK codebooks present. Thus, implementations are not limited solely to two HARK-ACK codebook arrangements. Further while some arrangements are discussed in terms of HARQ-ACK, the same principle may apply to other types of PUCCH/UCI, such as SR and CSI. Thus, some embodiments may not be limited solely to HARQ-ACK, but may be used with other types of UCI.

Some embodiments may be performed by a WD 22 and the resulting uplink transmission may be received/decoded accordingly by the network node 16.

In one embodiment, the HARQ-ACK codebook types may affect the processing of two (or more) HARQ-ACK codebooks by e.g., WD 22. For example, Embodiment 1-A may be applied only when the two (or more) HARQ-ACK codebooks are of the same type, e.g., both are Type 1 (also known as semi-static codebook) or both are Type 2 (also known as dynamic codebook). In another example, Embodiment 1-B and Embodiment 2 may be applied (e.g., by WD 22) when the two HARQ-ACK codebooks are of different types (e.g., one HARQ codebook is semi-static and the other is dynamic. In yet other aspects, the different embodiments may be applicable without regard to whether the HARQ codebook types are the same or different.

Embodiment 1: Concatenate Two HARQ-ACK Codebooks into a Composite HARQ-ACK Codebook In these embodiments, the two HARQ-ACK codebooks (e.g., HARQ codebook to be transmitted via PUCCH1 and HARQ codebook to be transmitted in PUCCH2) are concatenated e.g., by WD 22. No HARQ-ACK codebook is discarded.

Embodiment 1-A

In embodiment 1-A, the same beta factor is applied, e.g., by WD 22, to the composite/combined HARQ-ACK codebook. The composite HARQ-ACK codebook is then multiplexed with PUSCH. That is, the two HARQ-ACK codebooks may be concatenated or otherwise combined into the composite HARQ-ACK codebook [HARQ-ACK #1; HARQ_ACK #2]. The same beta factor may then be used to generate the coded bits of the composite HARQ-ACK codebook. HARQ-ACK is one type of UCI, and there may be other types of UCI (e.g., CSI-part1, CSI-part2, SR) that multiplex onto PUSCH as well. The coded bits of all relevant UCI may be multiplexed with the coded bits of PUSCH. This may imply that the two HARQ-ACK codebooks use the same code rate, thus having the same (or similar) reliability requirement. In some embodiments, the beta factor that is used for the UL transmission can, for example, be based on the higher beta factor, the low beta factor, or the beta factor that is used can be a function of the individual beta factors.

Embodiment 1-B

In embodiment 1-B, HARQ-ACK codebooks are also multiplexed with PUSCH; however, each HARQ-ACK codebook is associated with its own beta factor, for example, beta #1 for HARQ-ACK codebook #1 and beta #2 for HARQ-ACK codebook #2. Coded bit sequences, CodedBits_HARQ ACK #1 and CodedBits_HARQ_ACK #2, are generated (e.g., by WD 22) separately for HARQ-ACK #1 and HARQ-ACK #2, using their corresponding beta factor. The two coded bit sequences are then concatenated or otherwise combined, e.g., by WD 22 [CodedBits_HARQ_ACK #1; CodedBits_HARQ_ACK #2]. In some embodiments, after that, the concatenated coded bit sequence of HARQ-ACK is multiplexed with coded bits of other UCI (if exist) and coded bits of PUSCH. Alternatively, in some embodiments, CodedBits_HARQ_ACK #1 is multiplexed into PUSCH and CodedBits_HARQ_ACK #2 is multiplexed into PUSCH but the coded bits are not concatenated.

Embodiment 1-C

In embodiment 1-C, there is no overlapping PUSCH. The two HARQ-ACK codebooks are concatenated, e.g., by WD 22, into a composite HARQ-ACK codebook [HARQ_ACK #1; HARQ ACK #2]. The composite HARQ-ACK codebook is then transmitted e.g., by radio interface 82 of WD 22, on a PUCCH. The PUCCH may use a format different than those of HARQ_ACK #1 and HARQ_ACK #2, due to the longer length of the bit sequence.

Embodiment 2: Prioritize One HARQ-ACK Codebook

In this method, one HARQ-ACK codebook is prioritized (e.g., by WD 22 and/or network node 16) for transmission over the other HARQ-ACK codebook(s), while the other HARQ-ACK codebook is deprioritized and/or not transmitted. In general, in some embodiments, when there are M HARQ-ACK codebooks, one or more HARQ-ACK codebooks are prioritized, while the other ones are deprioritized and/or not transmitted (e.g., dropped, disregarded, ignored, etc.), e.g., in the current slot. In some embodiments, M can be any integer number greater than 1.

The prioritization may be performed (e.g., by WD 22 and/or network node 16) according to the priority level of the HARQ-ACK codebook. The priority level of the HARQ-ACK codebook may be determined (e.g., by WD 22 and/or network node 16) by one or more of the following:

a) The priority level of the associated PDSCH;

b) The priority level indicated in DCI by the network node 16;

c) The timing of the associated PDSCH. For example, the HARQ-ACK codebook corresponding to latest PDSCH is designated with higher priority;

d) The type of PDSCH, where the type is dynamic scheduled PDSCH, or DL-semi-persistently scheduled (SPS) PDSCH. For example, the HARQ-ACK codebook corresponding to DL-SPS scheduled PDSCH is designated with higher priority; and e) HARQ-ACK codebook type. For example, HARQ-ACK codebook Type 2 (i.e., dynamic codebook) is designated with higher priority than Type 1 (i.e., semi-static codebook).

Embodiment 2-A

In embodiment 2-A, there is a PUSCH overlapping with the prioritized HARQ-ACK codebook. In this embodiment, the prioritized HARQ-ACK may be multiplexed with PUSCH before the UL transmission by WD 22.

Embodiment 2-B

In embodiment 2-A, there is no PUSCH overlapping with the prioritized HARQ-ACK codebook. In this embodiment, the prioritized HARQ-ACK may be transmitted via PUCCH, using the PUCCH format associated with the prioritized HARQ-ACK.

Embodiment 3

Some embodiments may provide one or more of the following arrangements (implemented by WD 22 and/or network node 16):
Fixed number of HARQ-ACK bits for the early PDSCH transmission(s) and such bits to be multiplexed on UCI fields with reserved bit field for the HARQ-ARK for a transmission with different reliability requirement or priority.
  The early PDSCH transmission(s) have a different priority that is known to the WD 22;
    The priority can be indicated as a different service type by a higher layer, or a different reliability requirement, or by a field in DCI, etc.
    The PDSCH transmission can be dynamically or semi-statically configured.
    The early PDSCH is scheduled with a time slot to report HARQ-ARQ.
  A PUSCH transmission is using the same time slot of the HARQ-ARQ slot being assigned/configured to the early PDSCH.
  The PUSCH transmission is known to WD 22 to have a different priority or reliability requirement than the early PDSCH transmission.
  WD 22 has received e.g., via radio interface 82, an indication via higher layer configuration or DCI (e.g., from network node 16) to piggyback the HARQ-ARQ of the early PDSCH transmission(s) on the PUSCH.
  A fixed number of bits is known to WD 22 by DCI or higher layer configuration (e.g., RRC) to be used for the HARQ-ARQ transmission.
    The reserved bits can be in the UCI field that is used for the PUSCH transmission of same priority.
    The reserved bits can be in the PUSCH data field.
    The allocation of the reserved bits for HARQ-ARQ may be different depending on if there is UCI with a same priority on PUSCH or not.
  The HARQ-ACK bits from the different prioritized transmission(s) can puncture the PUSCH data.
    The PUSCH data can be purely PUSCH or PUSCH data with UCI multiplexed.
  A configurable field in DCI to indicate the size of HARQ-ACK bits. In NR Rel-15 such a bit field already exists to indicate the size of a single HARQ codebook: it is either 1 bit for a semi-static HARQ codebook (include HARQ codebook yes/no) or 2 bits for a dynamic HARQ codebook (size of the codebook mod-4 to reduce size to two bits). Here, in some embodiments, multiple such DCI fields could be included in DCI, one for each multiplexed HARQ CB. Alternatively, the bit field could be 2 or more bits that express the total HARQ codebook size in a mod-X way with X being, e.g., 4 (indicating DCI field is 2 bit), 8 (indicating DCI field is 3 bit), etc.

In Table 1 below, there are discussed various scenarios (embodiments) and resolution strategies, which may be performed by WD 22, such as via radio interface 82 and/or processing circuitry 84, and/or received/decoded accordingly by network node 16 (e.g., gNB), such as via radio interface 62 and/or processing circuitry 68.

TABLE 1

| Scenarios | PUCCH 1 | PUSCH | PUCCH 2 | Comments |
| --- | --- | --- | --- | --- |
| 1 | Transmit | Don't transmit | Transmit | Network node 16 waits for SR for the non-transmitted PUSCH (e.g., PUCCH2 in this example), or network node 16 can trigger a new PUSCH allocation if the PUSCH transport block (TB) is not received. |
| 2 | Transmit | Transmit non-overlapping part | Transmit | Network node 16 waits for SR for the left-over PUSCH (e.g., the overlapping part of the PUSCH that was not transmitted), or network node 16 can trigger a new PUSCH allocation for the leftover PUSCH TB or the whole TB. In another option, WD 22 can transmit the full message with lower reliability |

TABLE 1-continued

| Scenarios | PUCCH 1 | PUSCH | PUCCH 2 | Comments | |
|---|---|---|---|---|---|
| 3 | Transmit | Transmit non-overlapping part and overlapping part with PUCCH 2 | Don't transmit | (higher modulation and coding scheme (MCS)) on the non-overlapping part of the PUSCH. Such scenarios may be possible due to different priorities (or utility) of the messages; Or, based on utility gain maximization. | |
| 4 | Don't transmit | Transmit wholly | Don't transmit | Here, utility gain of PUSCH transmission is larger than if otherwise would have proceeded with scenario 1. Network node 16 can trigger immediate PUCCH allocation for the non-received PUCCH messages (PUCCH1 and PUCCH2 in this example). | |
| 5 | PUCCH 1 containing ACK(s) are dropped | Transmit non-overlapping part and overlapping part with PUCCH 1 | PUCCH 2 containing NACK or combinations of ACK(s) and NACK(s) | If any PUCCH contains ACK(s) (e.g., positive ACK for some DL TB(s)), then WD 22 may consider dropping that PUCCH message and rather transmit PUSCH instead on that interfering part (such rule can be defined in agreement with network node 16). | |
| 6 | WD 22 can combine PUCCH messages over the allocated PUCCHs and/or PUSCH (in any combination), such as in one or more of the various embodiments discussed in this disclosure; and/or Rest of the PUSCH can be considered for transmitting the remaining PUSCH TB. | | | | |
| 7 | Combine PUCCH 1 HARQ and PUCCH 2 HARQ at PUCCH 1 resource | Transmit wholly | | Assuming PUSCH is only interfering with one PUCCH (e.g., PUCCH 2 in this example), Combine interfering PUCCH messages with non-interfering PUCCH messages at non-interfering PUCCH resource(s). | See FIG. 11 |
| 8 | If PUSCH is a part of UL repetitions, then it can be dropped (fully or over the interfering part), provided it is not the only self-decodable repetition, e.g., PUSCH is one of the K repetitions in UL code-block group (CBG). | | | | |
| 9 | Include a control message (e.g., in some UCI/PUCCH/PUSCH) to report which scenario WD 22 has progressed with, if it is not straightforward by network node 16 to establish the messages content. | | | | |
| 10 | WD 22 may invoke a control message (via e.g., UCI/PUSCH) demanding a new allocation/conflict resolution from the network node 16. | | | | |

Figure 11:
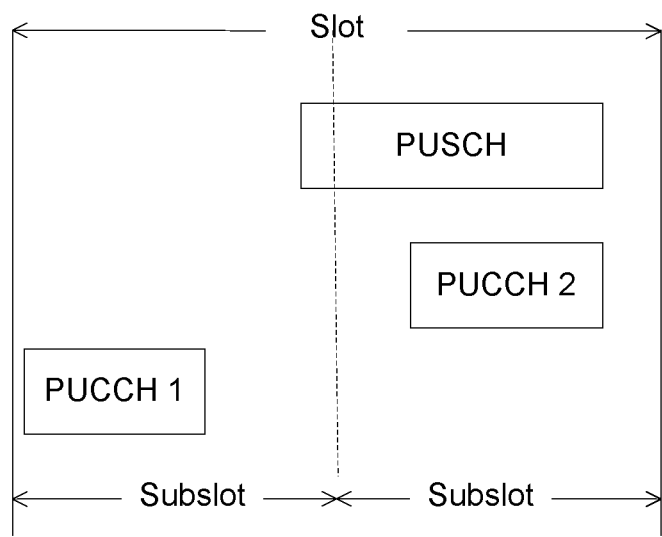
FIG. 11 illustrates an example scenario with one conflict according to some embodiments of the present disclosure.

FIG. 11 illustrates an example scenario with one conflict e.g., only 1 PUCCH overlaps with PUSCH and the other PUCCH does not overlap with PUSCH.

Embodiment 4: Encoding a New Codebook by Combing Two HARQ ACK

In another embodiment, instead of concatenating two HARQ-ACK codebooks, WD 22 encodes two HARQ-ACK messages into a new message (codebook) and transmits. The new codebook can be, for example, a compressed version of the concatenated codebook, i.e., it may require smaller number of bits. This is illustrated in Table 2, as an example.

TABLE 2

| HARQ-ACK1 | HARQ-ACK2 | New HARQ-AC |
|---|---|---|
| 0 | 0 | 0 |
| 0 | 1 | 0 |
| 1 | 0 | 0 |
| 1 | 1 | 1 |

In the above example, HARQ-ACK is zero (corresponding to HARQ-NACK) when either HARQ-ACK1 or HARQ-ACK2 is zero. HARQ-ACK is 1 if both HARQ-ACK1 and HARQ-ACK2 bits are 1.

Some embodiments of the present disclosure provide arrangements to resolve overlapping in time between one or more PUCCHs (e.g., HARQ codebooks) and a PUSCH.

Some embodiments may include one or more of the following:

Embodiment A1. A network node configured to communicate with a wireless device (WD), the network node configured to, and/or comprising a radio interface and/or comprising processing circuitry configured to:

transmit signaling to the WD; and receive at least a first uplink control information (UCI) and a second UCI in a time resource, at least one of the at least the first UCI and the second UCI combined and/or disregarded according to the transmitted signaling.

Embodiment A2. The network node of Embodiment A1, wherein one or more of:

the first and second UCIs include first and second HARQ codebooks, respectively;

the time resource is a slot including uplink resources; and the signaling is radio resource control (RRC) signaling and/or downlink control information (DCI) signaling.

Embodiment A3. The network node of any one of Embodiments A1 and A2, wherein one or more of:

the signaling includes a downlink control information (DCI) field indicating a HARQ codebook size;

the signaling includes at least one of an uplink grant and a downlink assignment;

the signaling indicates a prioritization and/or reliability associated with the at least one of the first UCI and the second UCI, the combination and/or the disregarding based at least in part on the indicated prioritization and/or the indicated reliability; the signaling indicates a number of HARQ bits for the at least one of the first UCI and the second UCI; and the signaling indicates one or more rules for resolving a conflict or a resolution associated with at least one of the first UCI, the second UCI and a physical uplink shared channel (PUSCH).

Embodiment B1. A method implemented in a network node, the method comprising:

transmitting signaling to the WD; and receiving at least a first uplink control information (UCI) and a second UCI in a time resource, at least one of the at least the first UCI and the second UCI combined and/or disregarded according to the transmitted signaling.

Embodiment B2. The method of Embodiment B1, wherein one or more of:

the first and second UCIs include first and second HARQ codebooks, respectively;

the time resource is a slot including uplink resources; and the signaling is radio resource control (RRC) signaling and/or downlink control information (DCI) signaling.

Embodiment B3. The method of any one of Embodiments B1 and B2, wherein one or more of:

the signaling includes a downlink control information (DCI) field indicating a HARQ codebook size;

the signaling includes at least one of an uplink grant and a downlink assignment;

the signaling indicates a prioritization and/or reliability associated with the at least one of the first UCI and the second UCI, the combination and/or the disregarding based at least in part on the indicated prioritization and/or the indicated reliability; the signaling indicates a number of HARQ bits for the at least one of the first UCI and the second UCI;

the signaling indicates one or more rules for resolving a conflict or a resolution associated with at least one of the first UCI, the second UCI and a physical uplink shared channel (PUSCH).

Embodiment C1. A wireless device (WD) configured to communicate with a network node, the WD configured to, and/or comprising a radio interface and/or processing circuitry configured to:

determine a first uplink control information (UCI) and a second UCI, the first UCI associated with a first physical uplink control channel (PUCCH) and the second UCI associated with a second PUCCH; and combine the first UCI and the second UCI and/or disregard at least one of the first UCI and the second UCI and/or transmit at least one of the first UCI and the second UCI in a time resource.

Embodiment C2. The WD of Embodiment C1, wherein the WD is further configured to, and/or the radio interface is further configured to and/or the processing circuitry is further configured to:

receive a signaling from the network node, the combination and/or the disregarding and/or the transmission is based at least in part on the received signalling.

Embodiment C3. The WD of any one of Embodiments C1 and C2, wherein one or more of:

the first and second UCIs include first and second HARQ codebooks, respectively;

the time resource is a slot including uplink resources; and the signaling is radio resource control (RRC) signaling and/or downlink control information (DCI) signaling.

Embodiment C4. The WD of any one of Embodiments C1-C3, wherein the WD is further configured to, and/or the radio interface is further configured to and/or the processing circuitry is further configured to one or more of:

determine whether or not there is an overlap or a conflict between the first UCI and the second UCI, the combination and/or the disregarding and/or the transmission is based at least in part on a resolution of the overlap or the conflict;

multiplex the combined UCI with physical uplink shared channel (PUSCH) information and transmit the multiplexed UCI on PUSCH;

combine the first UCI and the second UCI by concatenating the first UCI and the second UCI;

combine the first UCI and the second UCI by encoding a first and a second HARQ codebook into a third HARQ codebook that is a function of the first and the second HARQ codebooks;

prioritize one of the first UCI and second UCI over another one of the first UCI and second UCI;

combine and/or disregard at least one of the first UCI and second UCI based at least in part on the prioritization;

transmit the prioritized one of the first UCI and second UCI and/or disregard the other one of the first UCI and second UCI; and generate a coded bit sequence from at least one of the first UCI and the second UCI using a beta factor selected based at least in part on a reliability requirement, wherein how to combine the first UCI and the second UCI is optionally based at least in part on a HARQ codebook type.

Embodiment D1. A method implemented in a wireless device (WD), the method comprising:

determining a first uplink control information (UCI) and a second UCI, the first UCI associated with a first physical uplink control channel (PUCCH) and the second UCI associated with a second PUCCH; and combining the first UCI and the second UCI and/or disregarding at least one of the first UCI and the second UCI and/or transmitting at least one of the first UCI and the second UCI in a time resource.

Embodiment D2. The method of Embodiment D1 further comprises: receiving a signaling from the network node, the combining and/or the disregarding and/or the transmitting is based at least in part on the received signalling. Embodiment D3. The method of any one of Embodiments D1 and D2, wherein one or more of:

the first and second UCIs include first and second HARQ codebooks, respectively;

the time resource is a slot including uplink resources; and the signaling is radio resource control (RRC) signaling and/or downlink control information (DCI) signaling.

Embodiment D4. The method of any one of Embodiments D1-D3, further comprising one or more of:

determining whether or not there is an overlap or a conflict between the first UCI and the second UCI, the combination and/or the disregarding and/or the transmission is based at least in part on a resolution of the overlap or the conflict;

multiplexing the combined UCI with physical uplink shared channel (PUSCH) information and transmit the multiplexed UCI on PUSCH;

combining the first UCI and the second UCI further comprises concatenating the first UCI and the second UCI;

combining the first UCI and the second UCI further comprises encoding a first and a second HARQ codebook into a third HARQ codebook that is a function of the first and the second HARQ codebooks;

prioritizing one of the first UCI and second UCI over another one of the first UCI and second UCI;

combining and/or disregarding at least one of the first UCI and second UCI based at least in part on the prioritization;

transmitting further comprises transmitting the prioritized one of the first UCI and second UCI and/or disregarding the other one of the first UCI and second UCI; and generating a coded bit sequence from at least one of the first UCI and the second UCI using a beta factor selected based at least in part on a reliability requirement, wherein how to combine the first UCI and the second UCI is optionally based at least in part on a HARQ codebook type.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| eMBB | enhanced Mobile Broadband |
| LTE | Long Term Evolution |
| NR | Next Radio |
| PUCCH | Physical Uplink Control Channel |
| PUSCH | Physical Uplink Shared Channel |
| SR | Scheduling Request |
| URLLC | Ultra-Reliable Low Latency Communication |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a wireless device, WD, the method comprising:
   determining that there is an overlap in time within a slot between a physical uplink shared channel (PUSCH) transmission and both a first physical uplink control channel (PUCCH) transmission carrying first uplink control information (UCI) and a second PUCCH transmission carrying second UCI, the first UCI and the second UCI having different priority levels and the first and second PUCCH transmissions not overlapping in time;
   multiplexing the first and second UCI into the PUSCH transmission, the first UCI being multiplexed using a first beta factor and the second UCI being multiplexed using a second beta factor independent of the first beta factor; and
   transmitting the PUSCH transmission within the slot.

2. The method of claim 1, wherein the first PUCCH transmission and the second PUCCH transmission both carry Hybrid Automatic Repeat Request Acknowledgement, HARQ-ACK.

3. The method of claim 1, wherein multiplexing the first and second UCI into the PUSCH transmission comprises:
   using the first beta factor to generate at least one coded bit of the first UCI;
   using the second beta factor to generate at least one coded bit of the second UCI;
   multiplexing the at least one coded bit of the first UCI and the at least one coded bit of the second UCI with at least one coded bit of the PUSCH transmission.

4. The method of claim 3, wherein the multiplexing comprises:
   combining the at least one coded bit of the first UCI and the at least one coded bit of the second UCI and multiplexing the combined coded bits with the at least one coded bit of the PUSCH transmission.

5. The method of claim 4, wherein the combining comprises concatenating the at least one coded bit of the first UCI and the at least one coded bit of the second UCI.

6. A method implemented in a network node for receiving physical uplink shared channel (PUSCH), overlapping in time within a slot with both a first physical uplink control channel (PUCCH) carrying a first uplink control information (UCI) and a second PUCCH carrying second UCI, the first and second UCI having different priority levels, the first and second PUCCH not overlapping in time; and
   receiving the PUSCH within the slot, the first and second UCI being multiplexed into the PUSCH, the first UCI being multiplexed using a first beta factor and the second UCI being multiplexed using a second beta factor independent of the first beta factor.

7. The method of claim 6, wherein the first PUCCH transmission and the second PUCCH transmission both carry Hybrid Automatic Repeat Request Acknowledgement, HARQ-ACK.

8. The method of claim 6, wherein the first and second UCI are multiplexed into the PUSCH transmission by using the first beta factor to generate at least one coded bit of the first UCI; and using the second beta factor to generate at least one coded bit of the second UCI; and multiplexing the at least one coded bit of the first UCI and the at least one coded bit of the second UCI with at least one coded bit of the PUSCH transmission.

9. The method of claim 8, wherein the multiplexing comprises combining the at least one coded bit of the first UCI and the at least one coded bit of the second UCI and multiplexing the combined coded bits with the at least one coded bit of the PUSCH transmission.

10. The method of claim 9, wherein the combining comprises concatenating the at least one coded bit of the first UCI and the at least one coded bit of the second UCI.

11. A wireless device, WD, the wireless device comprising processing circuitry, the processing circuitry configured to cause the wireless device to:

determine that there is an overlap in time within a slot between a physical uplink shared channel (PUSCH) transmission and both a first physical uplink control channel (PUCCH) transmission carrying first uplink control information (UCI) and a second PUCCH transmission carrying second UCI, the first UCI and the second UCI having different priority levels and the first and second PUCCH transmissions not overlapping in time;

multiplex the first and second UCI into the PUSCH transmission, the first UCI being multiplexed using a first beta factor and the second UCI being multiplexed using a second beta factor independent of the first beta factor; and transmit the PUSCH transmission within the slot.

12. The WD of claim 11, wherein the first PUCCH transmission and the second PUCCH transmission both carry Hybrid Automatic Repeat Request Acknowledgement, HARQ-ACK.

13. The WD of claim 11, wherein multiplexing the first and second UCI into the PUSCH transmission comprises:
using the first beta factor to generate at least one coded bit of the first UCI;
using the second beta factor to generate at least one coded bit of the second UCI;
multiplexing the at least one coded bit of the first UCI and the at least one coded bit of the second UCI with at least one coded bit of the PUSCH transmission.

14. The WD of claim 13, wherein the multiplexing comprises:
combining the at least one coded bit of the first UCI and the at least one coded bit of the second UCI and multiplexing the combined coded bits with the at least one coded bit of the PUSCH transmission.

15. The WD of claim 14, wherein the combining comprises concatenating the at least one coded bit of the first UCI and the at least one coded bit of the second UCI.

16. A network node configured to communicate with a wireless device, the network node comprising processing circuitry, the processing circuitry configured to cause the network node to:
receive a physical uplink shared channel (PUSCH) overlapping in time within a slot with both a first physical uplink control channel (PUCCH) carrying a first uplink control information (UCI) and a second PUCCH carrying second UCI, the first and second UCI having different priority levels, the first and second PUCCH not overlapping in time; and
receive the PUSCH within the slot, the first and second UCI being multiplexed into the PUSCH, the first UCI being multiplexed using a first beta factor and the second UCI being multiplexed using a second beta factor independent of the first beta factor.

17. The WD of claim 16, wherein the first PUCCH transmission and the second PUCCH transmission both carry Hybrid Automatic Repeat Request Acknowledgement, HARQ-ACK.

18. The network node of claim 16, wherein the first and second UCI are multiplexed into the PUSCH transmission by using the first beta factor to generate at least one coded bit of the first UCI; and using the second beta factor to generate at least one coded bit of the second UCI; and multiplexing the at least one coded bit of the first UCI and the at least one coded bit of the second UCI with at least one coded bit of the PUSCH transmission.

19. The network node of claim 18, wherein the multiplexing comprises combining the at least one coded bit of the first UCI and the at least one coded bit of the second UCI and multiplexing the combined coded bits with the at least one coded bit of the PUSCH transmission.

20. The network node of claim 19, wherein the combining comprises concatenating the at least one coded bit of the first UCI and the at least one coded bit of the second UCI.

* * * * *